United States Patent
Kim et al.

(10) Patent No.: US 12,381,890 B2
(45) Date of Patent: Aug. 5, 2025

(54) SYSTEM AND METHOD FOR SECURE NETWORK ACCESS OF TERMINAL

(71) Applicant: PRIBIT Technology, Inc., Seoul (KR)

(72) Inventors: Young Rang Kim, Seoul (KR); Pil Ho Song, Seoul (KR); Hyun Seok Woo, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 231 days.

(21) Appl. No.: 17/656,136

(22) PCT Filed: Sep. 24, 2020

(86) PCT No.: PCT/KR2020/012926
§ 371 (c)(1),
(2) Date: Mar. 23, 2022

(87) PCT Pub. No.: WO2021/060856
PCT Pub. Date: Apr. 1, 2021

(65) Prior Publication Data
US 2022/0337604 A1    Oct. 20, 2022

Related U.S. Application Data

(63) Continuation-in-part of application No. 16/580,974, filed on Sep. 24, 2019, now Pat. No. 11,381,557, and
(Continued)

Foreign Application Priority Data

Jul. 9, 2020    (KR) ........................ 10-2020-0084912

(51) Int. Cl.
*H04L 9/40* (2022.01)
*G06F 21/55* (2013.01)
(Continued)

(52) U.S. Cl.
CPC ...... *H04L 63/1416* (2013.01); *H04L 63/1425* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 5,995,623 | A | 11/1999 | Kawano et al. |
| 6,076,168 | A | 6/2000 | Fiveash et al. |

(Continued)

FOREIGN PATENT DOCUMENTS

| | | |
|---|---|---|
| CN | 104284385 A | 1/2015 |
| CN | 105471748 A | 4/2016 |

(Continued)

OTHER PUBLICATIONS

Extended European Search Report dated Oct. 28, 2022 for European Pat. App. No. 20868832.5.
(Continued)

*Primary Examiner* — Venkat Perungavoor
(74) *Attorney, Agent, or Firm* — Seed IP Law Group LLP

(57) ABSTRACT

A system and a method for providing a secure network access of a terminal, the system including: a terminal; a gateway located at a boundary of a network to which the terminal belongs; and a server which manages data transmission between the terminal and the gateway. The server generates a control flow between the terminal and the server upon receiving a controller access request from the terminal; transmits, to the terminal, identification information of the control flow, and a threat detection policy stored in a database of the server; receives, from the terminal, the controller access update request including threat detection information indicating a result of executing a threat detec-
(Continued)

tion function installed in the terminal on the basis of the threat detection policy; and, when detection of a threat is confirmed from the threat detection information, cancels the control flow on the basis of the threat detection policy.

17 Claims, 19 Drawing Sheets

Related U.S. Application Data a continuation-in-part of application No. 16/580,866, filed on Sep. 24, 2019, now Pat. No. 11,190,494.

(51) Int. Cl.
| | |
|---|---|
| H04L 47/10 | (2022.01) |
| H04L 47/2483 | (2022.01) |
| G06F 21/56 | (2013.01) |
| H04L 47/2475 | (2022.01) |

(56) References Cited

U.S. PATENT DOCUMENTS

| | | | |
|---|---|---|---|
| 6,738,909 | B1 | 5/2004 | Cheng et al. |
| 6,963,982 | B1 | 11/2005 | Brustoloni et al. |
| 7,139,276 | B1 | 11/2006 | Sitaraman et al. |
| 7,215,667 | B1 | 5/2007 | Davis |
| 7,302,496 | B1 | 11/2007 | Metzger |
| 7,318,234 | B1 | 1/2008 | Dharmarajan |
| 7,346,770 | B2 | 3/2008 | Swander et al. |
| 7,606,902 | B2 | 10/2009 | Rao et al. |
| 7,760,636 | B1 | 7/2010 | Cheriton |
| 7,920,701 | B1 | 4/2011 | Cox et al. |
| 7,978,714 | B2 | 7/2011 | Rao et al. |
| 8,000,327 | B1 | 8/2011 | Minei et al. |
| 8,019,868 | B2 | 9/2011 | Rao et al. |
| 8,024,488 | B2 | 9/2011 | Salowey et al. |
| 8,289,968 | B1 | 10/2012 | Zhuang |
| 8,291,119 | B2 | 10/2012 | Rao et al. |
| 8,363,650 | B2 | 1/2013 | Rao et al. |
| 8,385,199 | B1 | 2/2013 | Coward et al. |
| 8,612,612 | B1 | 12/2013 | Dukes et al. |
| 8,843,998 | B2 | 9/2014 | Fu et al. |
| 8,892,778 | B2 | 11/2014 | Rao et al. |
| 8,897,299 | B2 | 11/2014 | Rao et al. |
| 8,923,853 | B1 | 12/2014 | Shaw et al. |
| 9,088,564 | B1 | 7/2015 | Hobson et al. |
| 9,106,538 | B1 | 8/2015 | Asnis |
| 9,143,481 | B2 | 9/2015 | Wood |
| 9,143,942 | B2 | 9/2015 | Agarwal et al. |
| 9,148,408 | B1 | 9/2015 | Glazemakers |
| 9,240,938 | B2 | 1/2016 | Dimond et al. |
| 9,252,972 | B1 | 2/2016 | Dukes et al. |
| 9,356,866 | B1 | 5/2016 | Sivaramakrishnan et al. |
| 9,402,002 | B1 | 7/2016 | Hao et al. |
| 9,578,052 | B2 | 2/2017 | Cp et al. |
| 9,715,597 | B2 | 7/2017 | Smith et al. |
| 9,860,208 | B1* | 1/2018 | Ettema ............... H04L 63/0227 |
| 9,912,673 | B2 | 3/2018 | Evenden et al. |
| 9,984,230 | B2 | 5/2018 | Pikhur et al. |
| 10,033,766 | B2 | 7/2018 | Gupta et al. |
| 10,129,207 | B1 | 11/2018 | Wan et al. |
| 10,162,767 | B2 | 12/2018 | Spurlock et al. |
| 10,176,344 | B2 | 1/2019 | Smith et al. |
| 10,205,743 | B2 | 2/2019 | Cp et al. |
| 10,243,833 | B2 | 3/2019 | Tang et al. |
| 10,326,672 | B2 | 6/2019 | Scheib et al. |
| 10,339,303 | B2 | 7/2019 | Mehta et al. |
| 10,402,577 | B2 | 9/2019 | Knapp et al. |
| 10,484,334 | B1 | 11/2019 | Lee et al. |
| 10,659,434 | B1 | 5/2020 | Kim et al. |
| 10,659,462 | B1 | 5/2020 | Kim et al. |
| 10,764,249 | B1 | 9/2020 | Kommula et al. |
| 10,785,111 | B2 | 9/2020 | Hill et al. |
| 10,812,576 | B1 | 10/2020 | Yuan et al. |
| 10,903,990 | B1 | 1/2021 | Ladd et al. |
| 11,271,777 | B2 | 3/2022 | Kim et al. |
| 11,379,611 | B1 | 7/2022 | Horesh et al. |
| 2001/0039576 | A1 | 11/2001 | Kanada |
| 2002/0010800 | A1 | 1/2002 | Riley et al. |
| 2002/0049899 | A1 | 4/2002 | Kenworthy |
| 2002/0161905 | A1 | 10/2002 | Haverinen et al. |
| 2002/0163920 | A1 | 11/2002 | Walker et al. |
| 2003/0041172 | A1 | 2/2003 | Calvignac et al. |
| 2003/0055978 | A1 | 3/2003 | Collins |
| 2003/0131263 | A1 | 7/2003 | Keane et al. |
| 2003/0188192 | A1 | 10/2003 | Tang et al. |
| 2003/0212900 | A1 | 11/2003 | Liu et al. |
| 2004/0081150 | A1 | 4/2004 | Chiang et al. |
| 2004/0088385 | A1 | 5/2004 | Blanchet et al. |
| 2004/0136534 | A1 | 7/2004 | Stiscia et al. |
| 2004/0139339 | A1 | 7/2004 | Yeh et al. |
| 2004/0190449 | A1 | 9/2004 | Mannal et al. |
| 2004/0215819 | A1 | 10/2004 | Tsuruoka et al. |
| 2005/0060328 | A1 | 3/2005 | Suhonen et al. |
| 2005/0111399 | A1 | 5/2005 | Sapienza et al. |
| 2005/0273609 | A1 | 12/2005 | Eronen |
| 2005/0273853 | A1 | 12/2005 | Oba et al. |
| 2005/0283604 | A1 | 12/2005 | Deshpande et al. |
| 2006/0018291 | A1 | 1/2006 | Patel et al. |
| 2006/0029062 | A1 | 2/2006 | Rao et al. |
| 2006/0029063 | A1 | 2/2006 | Rao et al. |
| 2006/0029064 | A1 | 2/2006 | Rao et al. |
| 2006/0037071 | A1 | 2/2006 | Rao et al. |
| 2006/0153067 | A1 | 7/2006 | Vasseur et al. |
| 2006/0159029 | A1 | 7/2006 | Samuels et al. |
| 2006/0182111 | A1 | 8/2006 | Wahl |
| 2006/0242405 | A1 | 10/2006 | Gupta et al. |
| 2006/0262808 | A1 | 11/2006 | Lin et al. |
| 2007/0088959 | A1 | 4/2007 | Cox et al. |
| 2007/0147421 | A1 | 6/2007 | Kim |
| 2007/0186100 | A1 | 8/2007 | Wakameda |
| 2007/0189486 | A1 | 8/2007 | Ise |
| 2008/0080509 | A1 | 4/2008 | Khanna et al. |
| 2008/0130515 | A1 | 6/2008 | Vasseur |
| 2008/0148379 | A1 | 6/2008 | Xu et al. |
| 2008/0162924 | A1 | 7/2008 | Chinitz et al. |
| 2008/0313240 | A1 | 12/2008 | Freking et al. |
| 2009/0077618 | A1 | 3/2009 | Pearce et al. |
| 2009/0245204 | A1 | 10/2009 | Voyer et al. |
| 2009/0287955 | A1 | 11/2009 | Matsumoto et al. |
| 2010/0002693 | A1 | 1/2010 | Rao et al. |
| 2010/0005311 | A1 | 1/2010 | Okamoto |
| 2010/0011056 | A1 | 1/2010 | Bryson et al. |
| 2010/0024026 | A1 | 1/2010 | Ylonen et al. |
| 2010/0061253 | A1 | 3/2010 | Kaminsky et al. |
| 2010/0199325 | A1* | 8/2010 | Raleigh ............... H04L 41/0806 726/3 |
| 2010/0278338 | A1 | 11/2010 | Chang et al. |
| 2010/0306816 | A1 | 12/2010 | Mcgrew et al. |
| 2011/0032868 | A1 | 2/2011 | Huang et al. |
| 2011/0158237 | A1 | 6/2011 | Mcdysan et al. |
| 2011/0161416 | A1 | 6/2011 | Mcdysan et al. |
| 2011/0261723 | A1* | 10/2011 | Yamato .................. H04L 45/66 370/255 |
| 2011/0271093 | A1 | 11/2011 | McKenna |
| 2012/0014314 | A1 | 1/2012 | Chen et al. |
| 2012/0084368 | A1 | 4/2012 | Go et al. |
| 2012/0303835 | A1 | 11/2012 | Kempf et al. |
| 2012/0304276 | A1 | 11/2012 | Legacy et al. |
| 2013/0054761 | A1 | 2/2013 | Kempf et al. |
| 2013/0083799 | A1 | 4/2013 | Xie et al. |
| 2013/0128892 | A1 | 5/2013 | Rao et al. |
| 2013/0163470 | A1 | 6/2013 | Chidambaram et al. |
| 2013/0166720 | A1 | 6/2013 | Takashima et al. |
| 2013/0232263 | A1 | 9/2013 | Kelly et al. |
| 2013/0318345 | A1 | 11/2013 | Hengeveld |
| 2013/0322255 | A1 | 12/2013 | Dillon |
| 2013/0336159 | A1 | 12/2013 | Previdi et al. |
| 2014/0059356 | A1 | 2/2014 | Nesnow |
| 2014/0101716 | A1 | 4/2014 | Touboul |
| 2014/0105382 | A1 | 4/2014 | Liu |
| 2014/0108668 | A1 | 4/2014 | Zhang et al. |
| 2014/0122716 | A1 | 5/2014 | Santhiveeran et al. |

(56) References Cited

U.S. PATENT DOCUMENTS

| | | |
|---|---|---|
| 2014/0156720 A1 | 6/2014 | Janakiraman et al. |
| 2014/0211799 A1 | 7/2014 | Yu et al. |
| 2014/0237137 A1 | 8/2014 | Ervin et al. |
| 2014/0237539 A1* | 8/2014 | Wing .................. H04L 63/08 726/1 |
| 2014/0241247 A1 | 8/2014 | Kempf et al. |
| 2014/0301396 A1 | 10/2014 | Hong et al. |
| 2014/0301397 A1 | 10/2014 | Zhou |
| 2014/0334488 A1 | 11/2014 | Guichard et al. |
| 2014/0359159 A1 | 12/2014 | Diaz-Cuellar |
| 2015/0074756 A1* | 3/2015 | Deng ................ H04L 63/1433 726/1 |
| 2015/0085664 A1 | 3/2015 | Sachdev et al. |
| 2015/0109967 A1 | 4/2015 | Hogan et al. |
| 2015/0121449 A1 | 4/2015 | Cp et al. |
| 2015/0188949 A1 | 7/2015 | Mahaffey et al. |
| 2015/0261972 A1 | 9/2015 | Lee |
| 2015/0281060 A1 | 10/2015 | Xiao |
| 2015/0281131 A1 | 10/2015 | Bhat et al. |
| 2015/0281173 A1 | 10/2015 | Quinn et al. |
| 2015/0341259 A1 | 11/2015 | Li et al. |
| 2015/0347768 A1 | 12/2015 | Martin et al. |
| 2015/0371055 A1 | 12/2015 | Park et al. |
| 2016/0043866 A1 | 2/2016 | Nixon et al. |
| 2016/0092700 A1 | 3/2016 | Smith et al. |
| 2016/0094661 A1 | 3/2016 | Jain et al. |
| 2016/0099917 A1 | 4/2016 | Glazemakers et al. |
| 2016/0105471 A1 | 4/2016 | Nunes et al. |
| 2016/0142293 A1 | 5/2016 | Hu et al. |
| 2016/0180092 A1 | 6/2016 | Aktas |
| 2016/0182550 A1 | 6/2016 | Spurlock |
| 2016/0191380 A1 | 6/2016 | De et al. |
| 2016/0197830 A1 | 7/2016 | Ulevitch et al. |
| 2016/0226779 A1 | 8/2016 | Kikuchi |
| 2016/0261557 A1 | 9/2016 | Herrero et al. |
| 2016/0283728 A1 | 9/2016 | Antonopoulos et al. |
| 2016/0285735 A1* | 9/2016 | Chen .................. H04L 45/02 |
| 2016/0285846 A1 | 9/2016 | Abe |
| 2016/0292430 A1 | 10/2016 | Antonopoulos et al. |
| 2016/0294710 A1 | 10/2016 | Sreeramoju |
| 2016/0315853 A1 | 10/2016 | Liste et al. |
| 2016/0352685 A1* | 12/2016 | Park .................. H04L 63/1458 |
| 2016/0359673 A1 | 12/2016 | Gupta et al. |
| 2016/0360352 A1 | 12/2016 | Khan et al. |
| 2016/0371484 A1 | 12/2016 | Mehta et al. |
| 2016/0373304 A1 | 12/2016 | Sharma et al. |
| 2016/0378685 A1 | 12/2016 | Spurlock et al. |
| 2016/0378975 A1 | 12/2016 | Pikhur et al. |
| 2016/0379003 A1 | 12/2016 | Kapoor et al. |
| 2016/0381051 A1 | 12/2016 | Edwards et al. |
| 2017/0012956 A1 | 1/2017 | Lee et al. |
| 2017/0026349 A1 | 1/2017 | Smith et al. |
| 2017/0034052 A1 | 2/2017 | Chanda et al. |
| 2017/0041229 A1 | 2/2017 | Zheng |
| 2017/0063782 A1 | 3/2017 | Jain et al. |
| 2017/0063927 A1 | 3/2017 | Schultz et al. |
| 2017/0078184 A1 | 3/2017 | Tang et al. |
| 2017/0099160 A1 | 4/2017 | Mithyantha et al. |
| 2017/0104851 A1 | 4/2017 | Arangasamy et al. |
| 2017/0118228 A1 | 4/2017 | Cp et al. |
| 2017/0171055 A1 | 6/2017 | Wang et al. |
| 2017/0223063 A1 | 8/2017 | Herrero |
| 2017/0237552 A1 | 8/2017 | Karame |
| 2017/0237760 A1 | 8/2017 | Holeman et al. |
| 2017/0264695 A1 | 9/2017 | Markovitz et al. |
| 2017/0317954 A1 | 11/2017 | Masurekar et al. |
| 2017/0339631 A1 | 11/2017 | Pugaczewski et al. |
| 2017/0346731 A1 | 11/2017 | Pukhraj Jain et al. |
| 2017/0353378 A1 | 12/2017 | Chen |
| 2017/0359247 A1 | 12/2017 | Dixon |
| 2017/0374025 A1 | 12/2017 | Pan |
| 2018/0013786 A1 | 1/2018 | Knopf |
| 2018/0018476 A1 | 1/2018 | Smith et al. |
| 2018/0026949 A1 | 1/2018 | Kimn et al. |
| 2018/0063077 A1 | 3/2018 | Tumuluru |
| 2018/0123827 A1 | 5/2018 | Josyula |
| 2018/0124183 A1 | 5/2018 | Kozat et al. |
| 2018/0139176 A1 | 5/2018 | Sato |
| 2018/0262487 A1 | 9/2018 | Zaifman et al. |
| 2018/0309786 A1 | 10/2018 | Apelewicz et al. |
| 2018/0324761 A1 | 11/2018 | Velev et al. |
| 2018/0337788 A1 | 11/2018 | Gajek et al. |
| 2018/0359231 A1 | 12/2018 | Vemulapalli et al. |
| 2019/0005148 A1 | 1/2019 | Lam et al. |
| 2019/0014152 A1 | 1/2019 | Verma et al. |
| 2019/0021122 A1 | 1/2019 | Kawasaki et al. |
| 2019/0036708 A1 | 1/2019 | Fregly et al. |
| 2019/0097805 A1 | 3/2019 | Shin et al. |
| 2019/0109822 A1 | 4/2019 | Clark et al. |
| 2019/0109848 A1 | 4/2019 | Clark et al. |
| 2019/0155752 A1 | 5/2019 | Spurlock et al. |
| 2019/0173736 A1 | 6/2019 | Ponnuswamy et al. |
| 2019/0173850 A1 | 6/2019 | Jain et al. |
| 2019/0173891 A1 | 6/2019 | Cp et al. |
| 2019/0190746 A1 | 6/2019 | Lee et al. |
| 2019/0205045 A1 | 7/2019 | Hugot et al. |
| 2019/0207747 A1 | 7/2019 | Durvasula et al. |
| 2019/0222559 A1 | 7/2019 | Wang et al. |
| 2019/0238592 A1 | 8/2019 | Qureshi et al. |
| 2019/0246148 A1 | 8/2019 | Oh et al. |
| 2019/0278908 A1 | 9/2019 | Mehta et al. |
| 2019/0306018 A1 | 10/2019 | Steverson et al. |
| 2019/0306035 A1 | 10/2019 | Scheib et al. |
| 2019/0312775 A1 | 10/2019 | Patil et al. |
| 2019/0313295 A1 | 10/2019 | Xu et al. |
| 2019/0335022 A1 | 10/2019 | Pasam et al. |
| 2019/0349317 A1 | 11/2019 | Lu |
| 2019/0349369 A1 | 11/2019 | Bengtson et al. |
| 2019/0372948 A1 | 12/2019 | Varghese et al. |
| 2019/0379532 A1 | 12/2019 | Si et al. |
| 2019/0394049 A1 | 12/2019 | Hartwig et al. |
| 2020/0036735 A1 | 1/2020 | Canard et al. |
| 2020/0052928 A1 | 2/2020 | Lee et al. |
| 2020/0068049 A1 | 2/2020 | Ngo et al. |
| 2020/0076733 A1 | 3/2020 | Venkataraman |
| 2020/0076740 A1 | 3/2020 | Kim et al. |
| 2020/0076927 A1 | 3/2020 | Barthur et al. |
| 2020/0112540 A1 | 4/2020 | Venkataraman |
| 2020/0119981 A1 | 4/2020 | Guthrie et al. |
| 2020/0153604 A1 | 5/2020 | Sun et al. |
| 2020/0162919 A1 | 5/2020 | Velev et al. |
| 2020/0177550 A1 | 6/2020 | Valluri et al. |
| 2020/0177606 A1* | 6/2020 | Valluri ................ H04L 63/1416 |
| 2020/0177658 A1 | 6/2020 | Barthur et al. |
| 2020/0184112 A1 | 6/2020 | Wallach |
| 2020/0213154 A1* | 7/2020 | Han .................. H04L 45/08 |
| 2020/0213280 A1 | 7/2020 | Guim Bernat et al. |
| 2020/0228503 A1 | 7/2020 | Zhang et al. |
| 2020/0244625 A1 | 7/2020 | Tummalapenta et al. |
| 2020/0252898 A1 | 8/2020 | Bild et al. |
| 2020/0274851 A1* | 8/2020 | Qiao .................. H04L 63/0263 |
| 2020/0287749 A1 | 9/2020 | Glazemakers et al. |
| 2020/0314179 A1 | 10/2020 | He et al. |
| 2020/0351254 A1 | 11/2020 | Xiong et al. |
| 2020/0389393 A1 | 12/2020 | Bosch et al. |
| 2021/0218777 A1* | 7/2021 | Chander ............ H04L 63/0428 |
| 2021/0243163 A1 | 8/2021 | Miriyala et al. |
| 2021/0266156 A1 | 8/2021 | Zee et al. |
| 2021/0266161 A1 | 8/2021 | Zee et al. |
| 2021/0328830 A1 | 10/2021 | Kim et al. |
| 2021/0360083 A1* | 11/2021 | Duggal ................ H04L 67/34 |
| 2022/0104181 A1 | 3/2022 | Velev et al. |
| 2022/0109698 A1* | 4/2022 | Roh ................ H04L 63/20 |
| 2022/0247720 A1 | 8/2022 | Kim |
| 2023/0247003 A1* | 8/2023 | Chanak ................ H04L 9/3226 726/1 |

FOREIGN PATENT DOCUMENTS

| | | |
|---|---|---|
| CN | 107445011 A | 12/2017 |
| EP | 3254415 A1 | 12/2017 |
| JP | 2007243655 A | 9/2007 |
| JP | 2009163546 A | 7/2009 |
| JP | 2010011122 A | 1/2010 |

(56) References Cited

FOREIGN PATENT DOCUMENTS

| | | |
|---|---|---|
| JP | 2011015327 A | 1/2011 |
| JP | 2011166704 A | 8/2011 |
| JP | 5239341 B2 | 7/2013 |
| JP | 2015053069 A | 3/2015 |
| JP | 2016189127 A | 11/2016 |
| JP | 2017535843 A | 11/2017 |
| JP | 2017537501 A | 12/2017 |
| JP | 2018508140 A | 3/2018 |
| JP | 2018524843 A | 8/2018 |
| JP | 2019079504 A | 5/2019 |
| KR | 1020020088728 A | 11/2002 |
| KR | 1020030075810 A | 9/2003 |
| KR | 100692653 B1 | 3/2007 |
| KR | 1020070037650 A | 4/2007 |
| KR | 100748698 B1 | 8/2007 |
| KR | 1020070102698 A | 10/2007 |
| KR | 100856674 B1 | 8/2008 |
| KR | 1020100008740 A | 1/2010 |
| KR | 101020470 B1 | 2/2011 |
| KR | 1020120045859 A | 5/2012 |
| KR | 101173583 B1 | 8/2012 |
| KR | 1020130045919 A | 5/2013 |
| KR | 1020130076798 A | 7/2013 |
| KR | 1020140055857 A | 5/2014 |
| KR | 1020140074357 A | 6/2014 |
| KR | 101481337 B1 | 1/2015 |
| KR | 1020150013453 A | 2/2015 |
| KR | 1020150088494 A | 8/2015 |
| KR | 101561108 B1 | 10/2015 |
| KR | 101578193 B1 | 12/2015 |
| KR | 1020160029660 A | 3/2016 |
| KR | 1020160056118 A | 5/2016 |
| KR | 1020160123069 A | 10/2016 |
| KR | 1020170010835 A | 2/2017 |
| KR | 101743559 B1 | 6/2017 |
| KR | 1020170063795 A | 6/2017 |
| KR | 1020170132608 A | 12/2017 |
| KR | 1020180006413 A | 1/2018 |
| KR | 1020180019273 A | 2/2018 |
| KR | 1020180030023 A | 3/2018 |
| KR | 1020180032864 A | 4/2018 |
| KR | 101861201 B1 | 5/2018 |
| KR | 1020180062838 A | 6/2018 |
| KR | 1020180086964 A | 8/2018 |
| KR | 101910605 B1 | 10/2018 |
| KR | 1020180132868 A | 12/2018 |
| KR | 2019-0037088 A | 4/2019 |
| KR | 1020190036504 A | 4/2019 |
| KR | 1020190052541 A | 5/2019 |
| KR | 1020190073114 A | 6/2019 |
| KR | 102119257 B1 | 6/2020 |
| KR | 102146568 B1 | 8/2020 |
| WO | WO 2013170177 A1 | 11/2013 |
| WO | 2014062337 A1 | 4/2014 |
| WO | 2016057177 A1 | 4/2016 |
| WO | 2016190641 A1 | 12/2016 |
| WO | 2017016473 A1 | 2/2017 |
| WO | WO 2017081864 A1 | 5/2017 |
| WO | WO 2017126556 A1 | 7/2017 |
| WO | WO 2018116123 A1 | 6/2018 |
| WO | 2021060856 A1 | 4/2021 |

OTHER PUBLICATIONS

Extended European Search Report dated Oct. 17, 2022 for European Pat. App. No. 20868932.3.

International Search Report and Written Opinion of the International Searching Authority; Application No. PCT/KR2020/012926; Completed: Jan. 5, 2021; Mailing Date: Jan. 5, 2021; 9 Pages.

Japanese Office Action issued Dec. 5, 2024 for Japanese Patent Appl. No. 2023136154.

Japanese First Office Action; Application No. 2022-515499; 7 Pages.

Japanese Office Action; Application No. 2022002658; Issued: Mar. 3, 2022; 10 Pages.

Hassan, Suhaidi, et al.; Border Gateway Protocol based Path Vector mechanism for inter-domain routing in Software Defined Network environment; IEEE Conference on Open Systems (ICOS); Langkawi, Malaysia; Oct. 10, 2016; 5 Pages.

Glatz, Eduard, et al.; Classifying Internet One-way Traffic; Proceedings of the 12th ACM SIGMETRICS/Performance joint international conference on Measurement and Modeling of Computer Systems (SIGMETRICS 12); Association for Computing Machinery; New York, NY, USA; May 15, 2012; 29 Pages.

Bilger, Brent, et al.; Cloud Security Alliance (CSA); Software-Defined Perimeter Working Group (SDP) Specification 1.0; Apr. 2014; 28 Pages.

Garbis, Jason, et al.; Cloud Security Alliance (CSA); Software-Defined Perimeter Architecture Guide; Mar. 10, 2020; 43 Pages.

Waliyi, Adebayo Gbenga; Study and Implementation of Wireless Sensor Networks to Manage Energy in a Smart Home; African University of Science and Technology; AUST Institutional Repository; Abuja, Nigeria; Dec. 15, 2017; 69 Pages.

Ikuta, Takayuki, et al.; Software Defined Perimeter (SDP) Usage Scenario Collection, Version 1.0; Japan Cloud Security Alliance, SDP Working Group; Apr. 25, 2019; 52 Pages.

Korean Office Action; Application No. 10-2020-0117543; Mailed: Nov. 13, 2020; 6 pages.

Korean Notice of Allowance; Application No. KR 10-2020-0105345; Dated: May 2, 2021.

Japanese Office Action; Application No. 2021-039780; Issued: Jun. 8, 2021; 13 Pages.

Extended European Search Report; Application No. 21162189.1; Completed: Jul. 7, 2021; Issued: Jul. 16, 2021; 44 Pages.

US Notice of Allowance; U.S. Appl. No. 16/580,974; Issued: Mar. 14, 2022; 8 Pages.

* cited by examiner

SYSTEM AND METHOD FOR SECURE NETWORK ACCESS OF TERMINAL

CROSS-REFERENCE TO RELATED APPLICATIONS

The present application is the National Stage of International Application No. PCT/KR2020/012926, filed on Sep. 24, 2020, which claims priority from U.S. patent application Ser. No. 16/580,866, filed on Sep. 24, 2019, and Ser. No. 16/580,974, filed on Sep. 24, 2019. International Application No. PCT/KR2020/012926 claims priority to Korean Patent Application No. 10-2020-0084912, filed on Jul. 9, 2020. The present application is a continuation-in-part of U.S. patent application Ser. No. 16/580,974, filed on Sep. 24, 2019. All prior applications are herein incorporated by reference.

TECHNICAL FIELD

The present disclosure relates to a system and a method for providing a secure network access of a terminal.

BACKGROUND ART

A plurality of devices may communicate data over a network. For example, a smartphone may transmit or receive data with a server over the Internet. The network may include a private network such as an intranet as well as a public network such as the Internet.

DISCLOSURE

Technical Problem

Because information capable of identifying a terminal is limited to an IP address and a media access control (MAC) address and it is difficult to manage a network connection in real time, in a transmission control protocol (TCP)/Internet protocol (IP)-based network environment, when a terminal in which a threat is inherent accesses a network, the corresponding threat may be infected to other entities which are present on the network.

To protect the terminal and the network from the threat, a terminal, the threat of which is detected on the network, may be identified to release access of the corresponding terminal. For example, to release access of the terminal, a method of blocking all connections matched to an IP address assigned to a terminal, a threat of which is detected, in network security equipment, blocking a corresponding terminal in a unit system the terminal accesses, or compulsorily ending the terminal by means of a security system installed in the terminal may be used. However, because such a method does not perfectly separate the terminal, the threat of which is detected, and because the terminal, the threat of which is detected, is able to bypass a security technology to make a continuous attack, it is difficult to protect the terminal and the network from the threat. In addition, because it pretends to be a normal connection environment using an attack technique such as session hijacking, it is difficult to perform efficient security and management in terms of network access control.

To protect the terminal from the threat, for example, various security solutions such as a malware detection and treatment application, a forgery and falsification prevention application, a private firewall, or an authentication solution may be used. However, because the security solution detects a threat in a wide area of the terminal, it may fail to ensure efficient safety in terms of a connection between an application which accesses the network and a destination network.

Various Embodiment disclosed in the specification is to provide a system for addressing the above-mentioned problem in a network environment and a method thereof.

Technical Solution

According to an aspect of the present disclosure, a system may include a terminal, a gateway located on a boundary of a network to which the terminal belongs, and a server that manages data transmission between the terminal and the gateway. The server may generate control flow between the terminal and the server, when receiving a controller access request from the terminal, may transmit identification information of the control flow and a threat detection policy stored in a database of the server to the terminal, may receive a controller access update request including threat detection information indicating the result of executing a threat detection function loaded into the terminal based on the threat detection policy from the terminal, and may release the control flow based on the threat detection policy, when threat detection is identified from the threat detection information.

According to an aspect of the present disclosure, a server may include a communication circuitry, a memory storing a database, and a processor operatively connected with the communication circuitry and the memory. The processor may receive an access request requesting controller access to the server from a terminal, may determine whether access of the terminal is possible, based on identification information included in the access request and the database, may generate identification information of control flow between the server and terminal, when the access of the terminal is possible, may transmit a response including the identification information of the control flow and a threat detection policy included in the database to the terminal, using the communication circuitry, may receive a controller access update request including threat detection information indicating the result of executing a threat detection function based on the threat detection policy from the terminal, may determine whether to release the control flow between the server and the terminal based on the threat detection information and the threat detection policy, and may transmit the result of processing the controller access update request to the terminal.

According to an aspect of the present disclosure, a terminal may include a communication circuitry, a processor operatively connected with the wireless communication circuitry, and a memory storing instructions executed by the processor. The processor may detect a controller access event for an external server, may transmit a controller access request to the external server, using the communication circuitry, may receive identification information of control flow between the terminal and the external server in response to the controller access request, from the external server, may execute a threat detection function based on a threat detection policy received from the external server, may transmit an access update request requesting to update controller access to the external server, using the communication circuitry, and may receive and process a response to the access update request from the external server. The access update request may include threat detection information indicating the result of executing the threat detection function and information necessary to update the controller access. The response may include the result of updating the controller access based on the threat detection information.

According to an aspect of the present disclosure, a method may include transmitting, by a terminal, a controller access request to a server, generating, by the server, control flow between the terminal and the server, transmitting, by the server, identification information of the control flow and a threat detection policy stored in a database of the server to the terminal, executing, by the terminal, a threat detection function loaded into the terminal based on the threat detection policy, transmitting, by the terminal, a controller access update request including threat detection information indicating the result of executing the threat detection function to the server, and releasing, by the server, the control flow based on the threat detection policy, when identifying threat detection by means of the threat detection information.

Advantageous Effects

According to embodiments disclosed in the present disclosure, because the network environment performs blacklist processing using various pieces of identification information such as identification information (e.g., a terminal ID, a user ID, and the like) generated by a unique algorithm other than networked identification information (e.g., an IP address and a MAC address of the terminal) of an existing terminal, it may separate a terminal, a continuous threat of which is detected, from a network to protect a destination network.

Furthermore, according to embodiments disclosed in the present disclosure, the network environment may apply a threat detection function to a point which should be attacked for network access to detect a threat in a wide area, thus clearly identifying an attack behavior and intention of the detected threat.

Furthermore, according to embodiments disclosed in the present disclosure, the network environment may detect a three-dimensional threat by means of interworking with a security system and may separate the detected terminal, thus preventing the threat from being propagated to a destination network.

Furthermore, according to embodiments disclosed in the present disclosure, when the terminal switches to an idle state depending on an access policy or requests to release access by a specific condition, the network environment may release access of the terminal, thus blocking a bypass attack using a connection of the idle state.

In addition, various effects ascertained directly or indirectly through the present disclosure may be provided.

MODE FOR INVENTION

Figure 1:
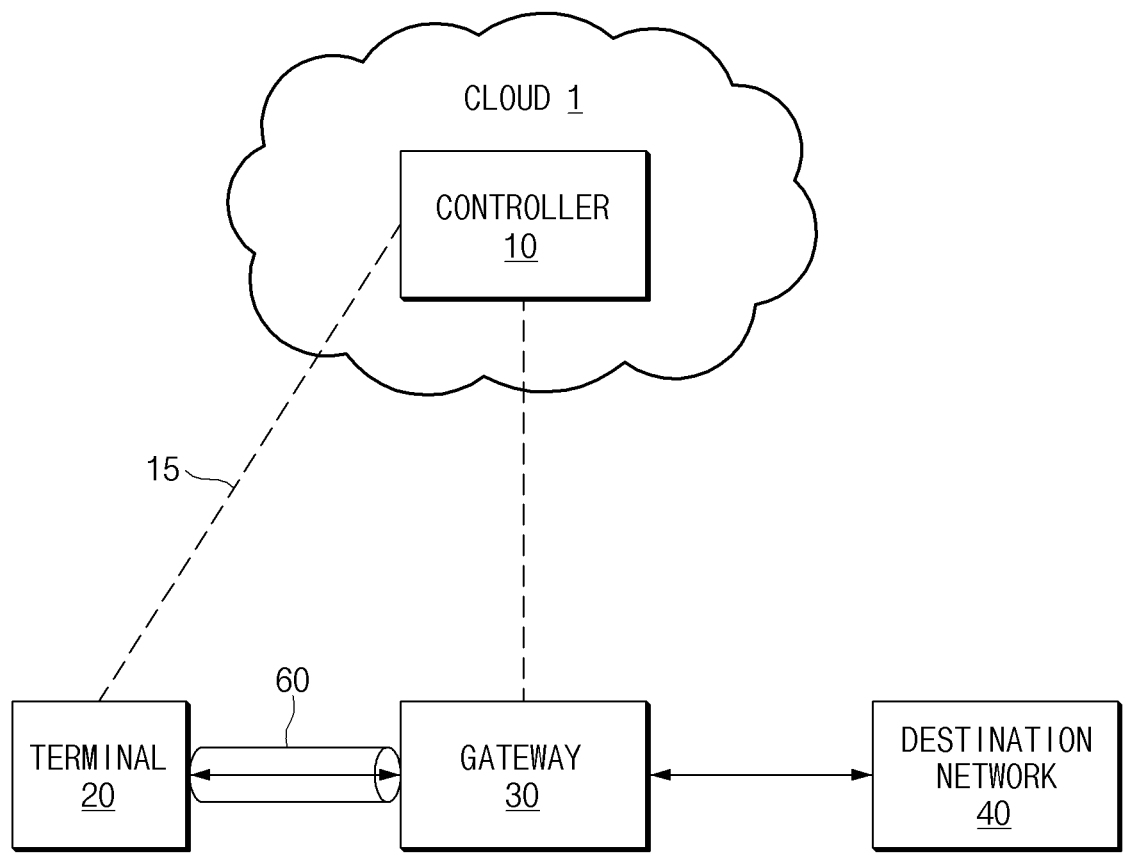
FIG. 1 illustrates an architecture of a controller-based network environment.

Hereinafter, various embodiments may be described with reference to accompanying drawings. However, it should be understood that this is not intended to limit the disclosure to specific implementation forms and includes various modifications, equivalents, and/or alternatives of embodiments of the disclosure.

A singular form of a noun corresponding to an item in the present disclosure may include one or plural of the items, unless the relevant context clearly indicates otherwise. In the specification, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if any (e.g., a first) component is referred to, with or without the term "operatively" or "communicatively", as "coupled with," "coupled to," "connected with," or "connected to" another (e.g., a second) component, it means that the element may be coupled with the other element directly (e.g., wiredly), wirelessly, or via a third component.

Each (e.g., a module or a program) of components described in the specification may include singular or plural entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the specification, the term "module" may include a unit implemented with hardware, software, or firmware, and may interchangeably be used with other terms, for example, "logic," "logic block," "part," or "circuitry". A module may be an integral part, or a minimum unit or portion thereof, adapted to perform one or more functions. For example, according to an embodiment, the module may be implemented in the form of an application-specific integrated circuit (ASIC).

Various embodiments of the present disclosure may be implemented as software (e.g., a program or an application) including one or more instructions that are stored in a machine-readable storage medium (e.g., a memory). For example, a processor of the machine may invoke at least one of the stored one or more instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device and does not include a signal (e.g., an electromagnetic wave), but this term does not differentiate between where data is semipermanently stored in the storage medium and where data is temporarily stored in the storage medium.

A method according to various embodiments disclosed in the specification may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least a part of the computer program product may be temporarily generated or at least temporarily stored in the machine-readable storage medium, such as a memory of the manufacturer's server, a server of the application store, or a relay server.

FIG. 1 illustrates an architecture of a controller-based network environment.

Referring to FIG. 1, the network environment may be configured with a controller 10, a terminal 20, a gateway 30, and a destination network 40. The terminal 20, the gateway 30, and the destination network 40 are shown one by one in FIG. 1, but not limited thereto. Two or more terminals 20, two or more gateways 30, and two or more destination networks 40 may be included. For example, the terminal 20 may transmit data to a plurality of destination networks through a plurality of gateways, and the controller 10 may manage a plurality of terminals and the plurality of gateways.

The controller 10 may be, for example, a server (an external server) located in a cloud 1. The controller 10 may manage data transmission between the terminal 20, the gateway 30, and the destination network 40 to ensure reliable data transmission in the network environment. For example, the controller 10 may manage access of the terminal 20 to the destination network 40 by means of policy information or blacklist information, may mediate generation of a tunnel 60 between the terminal 20 and the gateway 30, or may remove the tunnel 60 depending on a security event collected from the terminal 20 or the gateway 30. The terminal 20 may communicate with the destination network 40 through only the tunnel authorized by the controller 10. When there is no authorized tunnel 60, access of the terminal 20 to the destination network 40 may be blocked. According to an embodiment, the controller 10 may transmit and receive a control data packet with the terminal 20 to perform various operations (e.g., registration, grant, authentication, update, and end) associated with network access of the terminal 20. Flow in which the control data packet is transmitted may be referred to as control flow 15.

The terminal 20 may be various types of devices capable of performing data communication. For example, the terminal 20 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. The terminal 20 may be referred to as a 'node' or an 'electronic device'.

The gateway 30 may be located on a boundary of a network to which the terminal 20 belongs or a boundary of the destination network 40. The gateway 30 may be plural in number. The gateway 30 may forward only a data packet received through the authorized tunnel 60 among data packets received from the terminal 20 to the destination network 40. Flow in which a data packet is transmitted between the terminal 20 and the gateway 30 or between the gateway 30 and the destination network 40 may be referred to as data flow. According to an embodiment, the gateway 30 may be connected with the controller 10 based on the cloud. The gateway 30 may generate the authorized tunnel 60 with the terminal 20 under control of the controller 10.

Figure 2:
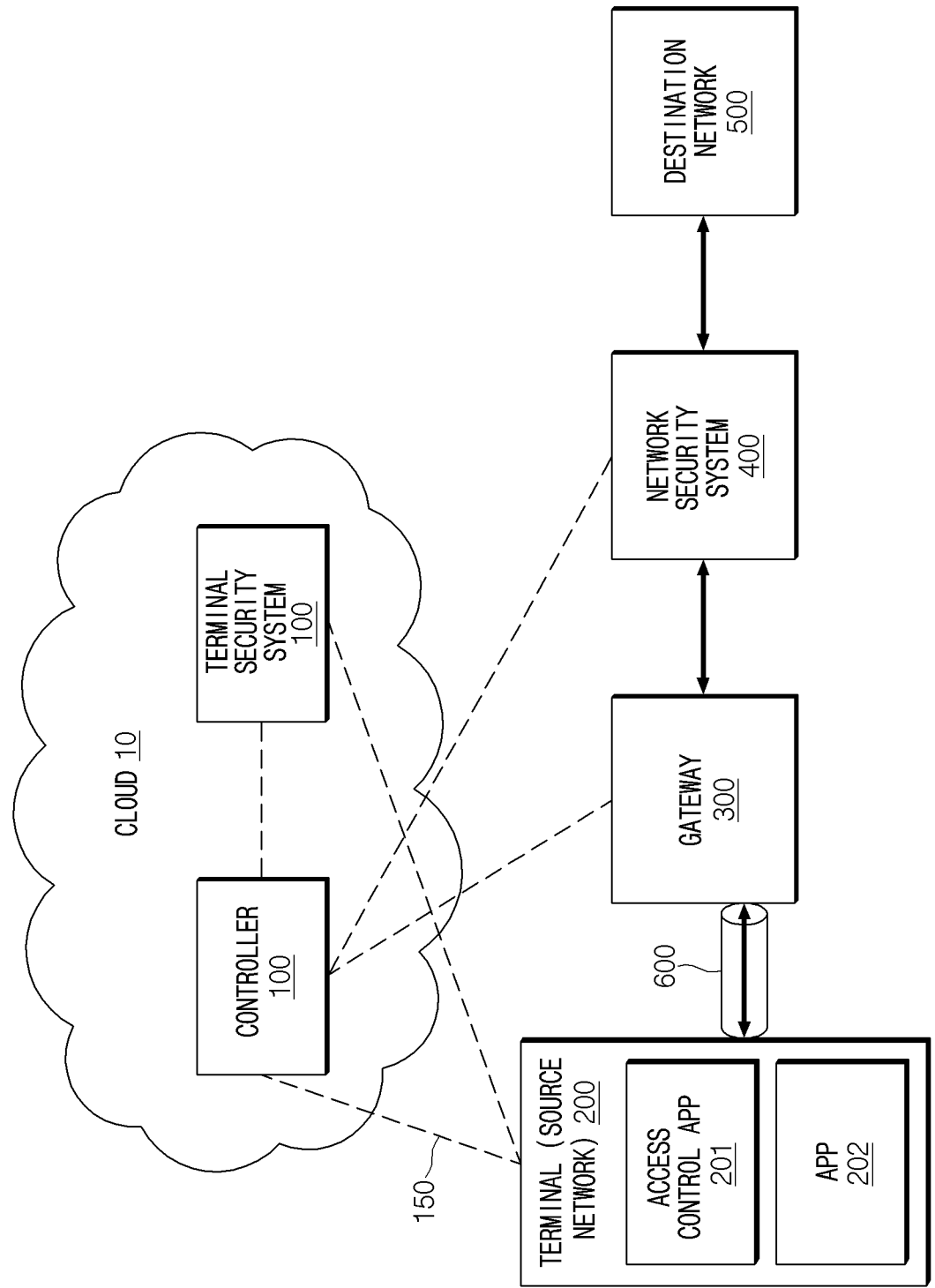
FIG. 2 illustrates a network environment including a security system according to various embodiments.

FIG. 2 illustrates a network environment including a security system according to various embodiments.

Referring to FIG. 2, the network environment including the security system may configured with a controller 100, a terminal security system 110, a terminal 200, a gateway 300, a network security system 400, a destination network 500, a tunnel 600, and the like. Herein, the controller 100, the terminal 200, the gateway 300, the destination network 500, and the tunnel 600 may perform the same or similar functions to components having the same names in FIG. 1.

The controller 100 may collect and analyze information (threat detection information) about a threat detected by the terminal security system 110 located in a cloud 10, the terminal 200, the gateway 300, and the network security system 400. The terminal security system 110 may be operatively connected with the controller 100 or may be included in the controller 100. The terminal security system 110 may detect a terminal threat using a threat detection technique. The terminal security system 110 may be implemented with a malware detection application, a behavior analysis-based threat detection system, an authentication system, and/or the like. The network security system 400 may be located between the gateway 300 and the destination network 500 to detect a network threat using the threat detection technique. The network security system 400 may be implemented with an intrusion detection system (IDS), an intrusion prevention system (IPS), and/or the like. The terminal 200 and the gateway 300 may detect a threat using a loaded threat detection function and may always or periodically transmit information about the detected threat to the controller 100. For example, when threat detection information is received, the controller 100 may analyze the threat detection information based on a policy stored in the controller 100. When the controller 100 should release access of the terminal 200 depending on the analyzed result, it may remove control flow 150 or the tunnel 600 connected with the terminal 200 to separate the terminal 200.

The terminal 200 may include an access control application 201, an application 202, and a network driver (not shown). The access control application 201 may play a role in managing and controlling network access of the application 202. For example, when an access event of the application 202, such as a web browser or a business application stored in the terminal 200, to the destination network 500 occurs, the access control application 201 may request network access of the application 202 from the controller 100 through control data packet flow 150 or may generate the authorized tunnel 600 with the gateway 300 under control of the controller 100. When access of the application 202 is possible and there is the authorized tunnel 600, the access control application 201 may transmit a data packet to the gateway 300 through the authorized tunnel 600. The access control application 201 may control transmission of a data packet by means of a kernel including an operating system in the terminal 200 and the network driver.

A threat detection function of detecting an unidentified threat may be loaded into the access control application 201. The example in which the threat detection function is loaded into the access control application 201 is described in the present embodiment, but not limited thereto. The threat detection function may be implemented as a separate application. The access control application 201 may detect a threat using the loaded threat detection function and may transmit information about the detected threat, that is, threat detection information (threat information) to the controller 100 or the terminal security system 110.

The threat detection function may detect a threat applied to a minimized attack surface. The minimized attack surface refers to a point (e.g., an attack target and an attack range) which should be attacked to access a destination network using a terminal (e.g., a stolen terminal or an infected terminal) in which a threat is inherent. Because it is unable to access the destination network without applying the threat to the minimized attack surface, each component (e.g., the controller 100, the terminal 200, or the gateway 300) in the above-mentioned network environment may detect the threat using the threat detection function loaded into the attack surface and may always or periodically transmit information (threat detection information) about the detected threat to the controller 100.

The threat detection function may detect a direct threat element such as memory and application (binary) forgery and/or falsification of the access control application 201 of the terminal 200, control data packet flow forgery and/or falsification between the terminal 200 and the controller 100, and/or tunnel and data packet flow forgery and/or falsification between the terminal 200 and the gateway 300. Furthermore, the threat detection function may detect an indirect threat element such as a continuous access attempt of an unauthorized application or an unauthorized terminal.

When the threat is detected, the controller 100 may remove control flow generated between the controller 100 and the terminal 200 from a control flow table, such that control data packet flow between the controller 100 and the terminal 200 is ended. When the control flow is removed, the terminal 200 may not request new network access and may not transmit a data packet to the destination network as a tunnel previously authorized for accessing the destination network and data flow information are removed. Thus, the terminal 200 may be in a state where it is separated from the destination network.

Furthermore, the controller 100 may add identification information (e.g., an IP address, a terminal ID, a user ID, or the like) of a terminal in which a continuous threat occurs to a blacklist depending on a blacklist policy (e.g., when greater than a certain time or the number of times of a certain threat, or the like), thus separating the terminal from the network. The controller 100 may transmit the updated blacklist to the gateway 300 to be shared. When the terminal added to the blacklist requests controller access, the controller 100 may check the blacklist based on identification information of the terminal added to the blacklist to deny generation of control flow. The gateway 300 may perform blacklist check based on terminal identification information irrespective of whether the data packet transmitted from the terminal added to the blacklist is received through an authorized tunnel and may block routing of the data packet. Thus, the terminal registered with the blacklist may be perfectly separated from the network.

Furthermore, because the controller 100 collects threat detection information from the component into which the threat detection function is loaded and simultaneously performs three-dimensional threat detection and collection by means of interworking with the terminal security system 110 and the network security system 400, the above-mentioned network environment may immediately release access of a terminal, a threat of which is detected, thus preventing the threat from being propagated to the destination network 500.

Figure 3:
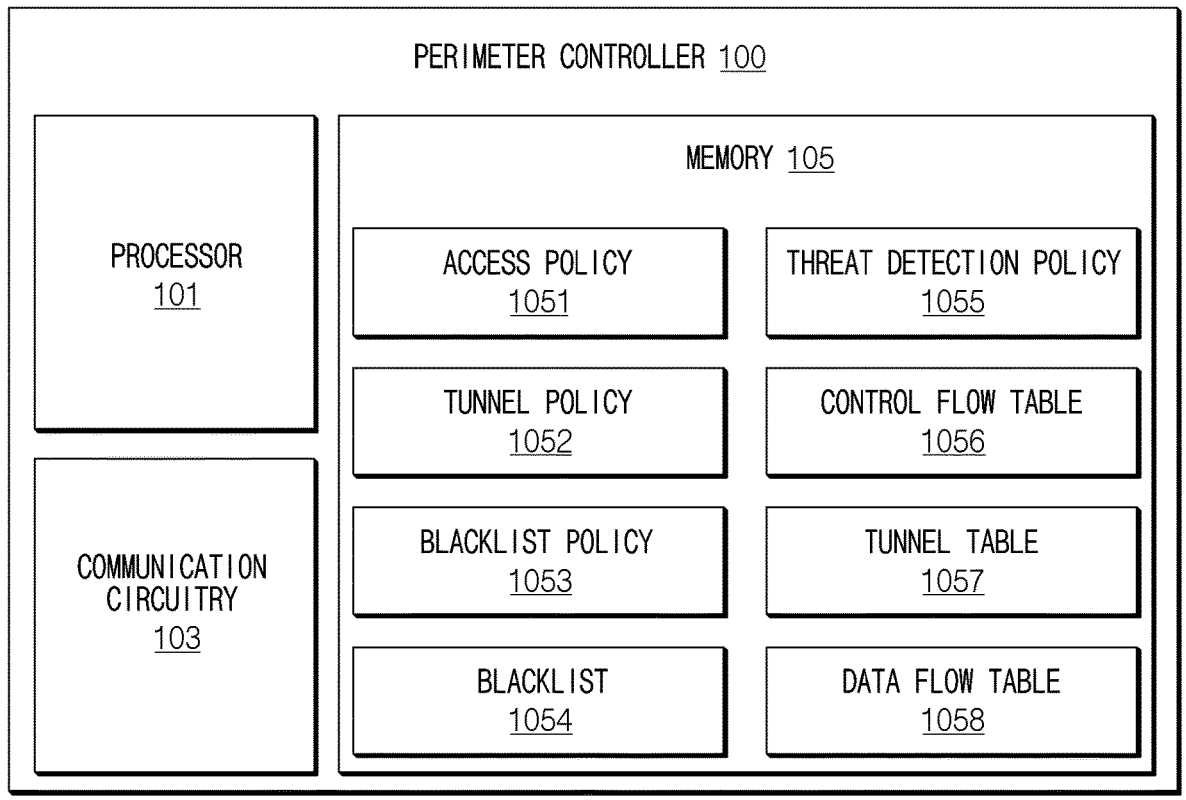
FIG. 3 illustrates a structure of a controller according to various embodiments.

FIG. 3 illustrates a structure of a controller according to various embodiments.

Referring to FIG. 3, a controller 100 may include a processor 101, communication circuitry 103, and a memory 105.

The processor 101 may control the overall operation of the controller 100. In various embodiments, the processor 101 may include one processor single core or may include a plurality of processor cores. For example, the processor 101 may include a multi-core such as a dual-core, a quad-core, or a hexa-core. According to embodiments, the processor 101 may further include a cache memory located internally or externally. According to various embodiments, the processor 101 may be configured with one or more processors. For example, the processor 101 may include at least one of an application processor, a communication processor, or a graphical processing unit (GPU).

The processor 101 may receive commands of other components of the controller 100, may interpret the received commands, and may perform calculation or may process data, depending on the analyzed commands. The processor 101 may interpret and process a message, data, an instruction, or a signal received from the communication circuitry 103 or the memory 105. The processor 101 may generate a new message, data, instruction, or signal based on the received message, data, instruction, or signal. The processor 101 may provide the communication circuitry 103 or the memory 105 with the processed or generated message, data, instruction, or signal.

The processor 101 may process data or a signal which is generated or occurs by a program. For example, the processor 101 may request an instruction, data, or a signal from the memory 105 to run or control the program. The processor 101 may record (or store) or update an instruction, data, or a signal in the memory 105 to run or control the program.

The communication circuitry 103 may assist in establishing a wired or wireless communication connection between the controller 100 and an external electronic device (e.g., a terminal 200, a gateway 300, or a network security system 400) and performing communication over the established connection. According to an embodiment, the communication circuitry 103 may include wireless communication circuitry (e.g., cellular communication circuitry, short range wireless communication circuitry, or global navigation satellite system (GNSS) communication circuitry) or wired communication circuitry (e.g., local area network (LAN) communication circuitry or power line communication circuitry) and may communicate with the external electronic device over a short range communication network, such as Bluetooth, WiFi direct, or infrared data association (IrDA), or a long range communication network, such as a cellular network, the Internet, or a computer network using the corresponding communication circuitry among them. The above-mentioned several types of communication circuitry 103 may be implemented as one chip or may be respectively implemented as separate chips.

The memory 105 may store an instruction controlling the terminal, a control instruction code, control data, or user data. For example, the memory 105 may include at least one of an application program, an operating system (OS), middleware, or a device driver.

The memory 105 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like. The memory 105 may further include a non-volatile medium such as a hard disk drive (HDD), a solid state disk (SSD), an embedded multi media card (eMMC), or a universal flash storage (UFS).

The memory 105 may include databases 1051 to 1058 for controlling network access and data transmission.

The access policy database 1051 may include network and/or service information accessible by an identified network, terminal, or user, an unidentified user (a guest), an application, or the like. For example, when there is a network access request from the terminal 200, the controller 100 may determine whether the identified network, terminal, user (e.g., the user of the terminal), application (e.g., the application included in the terminal), and/or the like is accessible to the destination network 500 and the service based on the access policy database 1051.

The tunnel policy database 1052 may include a type of a tunnel to be connected to a gateway 300 or a destination node (e.g., a destination network) in which a source node (e.g., the terminal) is present on a boundary of the network on a connection path according to an access policy, an encryption method, and level information. When the network access request is received from the terminal 200, the controller 100 may provide the terminal with an optimal tunnel for accessing the destination network or node and information about it based on the tunnel policy database 1052.

The blacklist policy database 1053 may include a policy for permanently or temporarily blocking access of a specific terminal. The blacklist policy database 1053 may be set (generated) based on information identified by means of a risk level, a cycle of occurrence, a behavior analysis, and/or the like of a security event among security events collected on a periodic basis from the terminal 200 or the gateway 300. Herein, the identified information may be at least one of a terminal identifier (ID), an IP address, a media access control (MAC) address, or a user ID.

The blacklist database 1054 may include a terminal ID, an IP address, a MAC address, or a user ID, access of which is blocked by the blacklist policy database 1053. When network access is requested from the terminal 200 and when identification information of the terminal 200 is included in the blacklist database 1054, the controller 100 may deny the network access request of the terminal 200. Thus, the terminal 200 may be in a perfectly separated state where network access is impossible.

The threat detection policy database 1055 may include a policy for determining whether to end access of the terminal based on a security event collected from the terminal or the gateway (e.g., a report about unidentified access detected from the terminal or the gateway).

The control flow table 1056 is a session table for managing flow (e.g., control flow) of a control data packet generated between the terminal 200 and the controller 100. When the terminal 200 successfully accesses the controller 100, the controller 100 may generate control flow and identification information for identifying the control flow. The control flow information may include at least one of pieces of information such as an IP address, a terminal ID, a user ID, or the like identified when accessing and authenticating the controller 100. The terminal 200 may transmit control flow identification information when requesting network access. The controller 100 may search the control flow table 1056 for control flow information by means of the control flow identification information received from the terminal 200. The controller 100 may map at least one of pieces of information such as an IP address, a terminal ID, or a user ID included in the found control flow information with the access policy database 1051 to determine whether terminal access is possible and whether the tunnel is generated.

The control flow information may include state information and an expiration time of the control flow. The terminal 200 should update the expiration time of the control flow on a periodic basis. When the update is not performed during a certain time, the control flow may be removed. Furthermore, when it is determined that immediate access blocking is needed according to threat detection information collected from the terminal 200 and the gateway 300 or when there is a network access end request from the terminal 200, the controller 100 may remove the control flow. When the control flow is removed, because the tunnel and the data flow, which are previously generated, are also removed (collected), all of network access of the terminal 200 may be blocked.

The tunnel table 1057 may be a table for managing a tunnel connected between the terminal 200 and the gateway 300 or between the terminal 200 and a destination node. The tunnel may be generated for each device (terminal) or each IP. The tunnel information included in the tunnel table 1057 may include tunnel identification information (e.g., a tunnel ID), control flow identification information, and additional information. The tunnel identification information may be information for managing and identifying a valid tunnel, and the control flow identification information may be information for identifying dependent control flow, when there is a tunnel dependent on control flow. The additional information may include a tunnel end point (TEP), a tunnel start point (TSP), a tunnel algorithm, a tunnel type, and/or the like.

The data flow table 1058 may be a table for managing flow (e.g., data flow) in which a detailed data packet is transmitted between the terminal 200 and the gateway 300. The data flow may be generated for each TCP session in the tunnel, for each application of a source terminal, or in a more detailed unit. The data flow information included in the data flow table 1058 may include data flow identification information, control flow identification information when data flow is dependent on control flow, an application ID for identifying data flow of an authorized target, a destination IP address, and/or a service port.

The tunnel table 1057 and the data flow table 1058 included in the memory 105 of the controller 100 may be applied to the terminal 200 in the same manner.

Because the policies are able to be set about a connection for controlling access between a source (e.g., the terminal 200) and a destination (e.g., the destination network 500) by a manager, detailed network access control is possible compared to existing network access control (NAC) and firewall.

Figure 4:
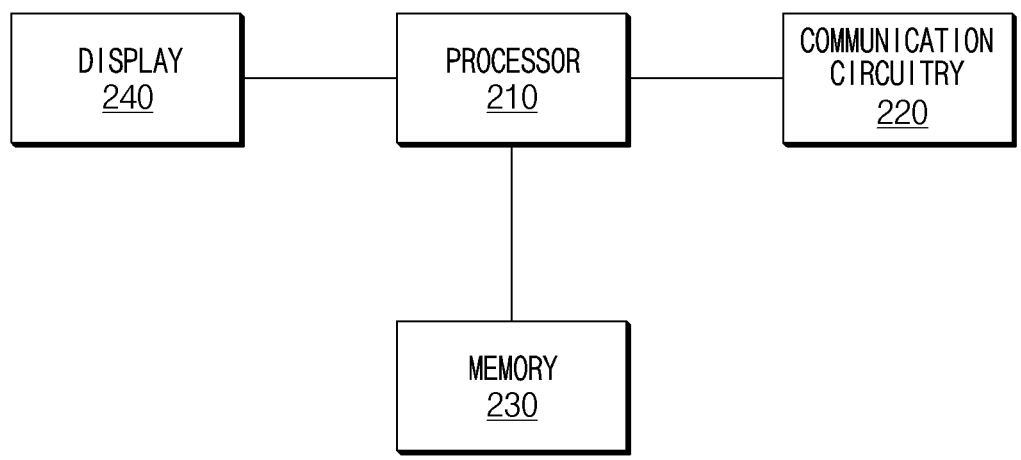
FIG. 4 is a functional block diagram of a terminal (e.g., a terminal 200 of FIG. 2) according to various embodiments.

FIG. 4 is a functional block diagram of a terminal (e.g., a terminal 200 of FIG. 2) according to various embodiments.

Referring to FIG. 4, the terminal 200 may include a processor 210, communication circuitry 220, a memory 230, and a display 240.

The processor 210 may control the overall operation of the terminal. In various embodiments, the processor 210 may include one processor single core or may include a plurality of processor cores. For example, the processor 210 may include a multi-core such as a dual-core, a quad-core, or a hexa-core. According to embodiments, the processor 210 may further include a cache memory located internally or externally. According to various embodiments, the processor 210 may be configured with one or more processors. For example, the processor 210 may include at least one of an application processor, a communication processor, or a graphical processing unit (GPU).

All or a portion of the processor 210 may be electrically or operatively coupled with or connected to another component (e.g., the communication circuitry 220, the memory 230, or the display 240) in the terminal. The processor 210 may receive commands of other components of the terminal, may interpret the received commands, and may perform calculation or may process data, depending on the analyzed commands. The processor 210 may interpret and process a message, data, an instruction, or a signal received from the communication circuitry 220, the memory 230, or the display 240. The processor 210 may generate a new message, data, instruction, or signal based on the received message, data, instruction, or signal. The processor 210 may provide the communication circuitry 220, the memory 230, or the display 240 with the processed or generated message, data, instruction, or signal.

The processor 210 may process data or a signal which is generated or occurs by a program. For example, the processor 210 may request an instruction, data, or a signal from the memory 230 to run or control the program. The processor 210 may record (or store) or update an instruction, data, or a signal in the memory 230 to run or control the program.

The communication circuitry 220 may assist in establishing a wired or wireless communication connection between the terminal and an external electronic device (e.g., a controller 100 or a gateway 300 of FIG. 2) and performing communication through the established connection. According to an embodiment, the communication circuitry 220 may include wireless communication circuitry (e.g., cellular communication circuitry, short range wireless communication circuitry, or global navigation satellite system (GNSS) communication circuitry) or wired communication circuitry (e.g., local area network (LAN) communication circuitry or power line communication circuitry) and may communicate with the external electronic device over a short range communication network, such as Bluetooth, WiFi direct, or infrared data association (IrDA), or a long range communication network, such as a cellular network, the Internet, or a computer network using the corresponding communication circuitry among them. The above-mentioned several types of communication circuitry 220 may be implemented as one chip or may be respectively implemented as separate chips.

The memory 230 may store an instruction controlling the terminal, a control instruction code, control data, or user data. For example, the memory 230 may include at least one of an application program, an operating system (OS), middleware, or a device driver.

The memory 230 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like.

The memory 230 may further include a non-volatile medium such as a hard disk drive (HDD), a solid state disk (SSD), an embedded multi media card (eMMC), or a universal flash storage (UFS).

According to an embodiment, the memory 230 may store some of pieces of information included in a memory (e.g., a memory 105 of FIG. 3) of the controller. For example, the memory 230 may store a tunnel table 1057 and a data flow table 1058 described in FIG. 3.

The display 240 may output content, data, or a signal to perform an interface with a user. In various embodiments, the display 240 may display image data processed by the processor 210. According to embodiments, the display 240 may be combined with a plurality of touch sensors (not shown) capable of receiving a touch input or the like to be configured with an integrated touch screen. When the display 240 is configured with the touch screen, the plurality of touch sensors may be arranged over the display 240 or under the display 240.

Figure 5:
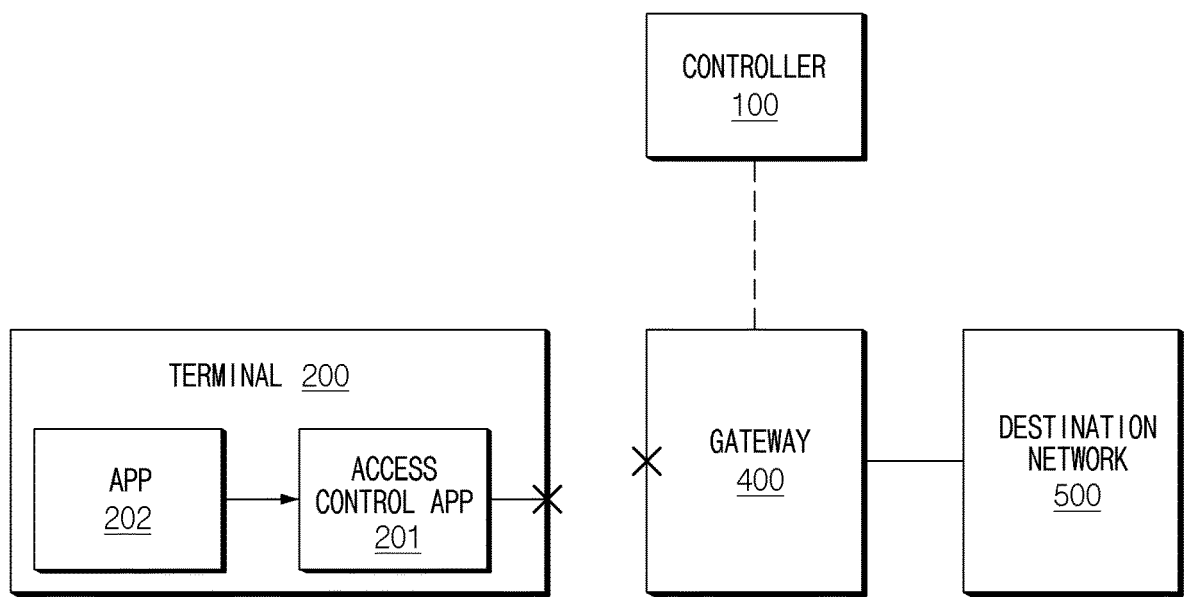
FIG. 5 illustrates an operation of controlling network access of a terminal according to various embodiments.

FIG. 5 illustrates an operation of controlling network access of a terminal according to various embodiments.

Referring to FIG. 5, when receiving an access request for a destination network 500 from an application (e.g., a web browser) 202, an access control application 201 loaded into a terminal 200 may determine whether the terminal 200 or the application 202 accesses the controller 100. When the terminal 200 or the application 202 does not access the controller 100, the access control application 201 may block transmission of a data packet in a kernel including an operating system or a network driver.

According to another embodiment, when a threat detection function is not loaded into the access control application 201 or when a malicious application bypasses control of the access control application 201, an unauthorized data packet may be transmitted from the terminal 200. In this case, because a gateway 300 which is present on a boundary of a network blocks a data packet received through an unauthorized tunnel, a data packet transmitted from the terminal 200

(e.g., a data packet for generating a TCP session) may fail to arrive at the destination network 500. In other words, the terminal 200 may be separated from the destination network 500.

When the access of the terminal is released, because there is no authorized tunnel between the terminal 200 and the gateway 300, the terminal may not access the destination network. Furthermore, because the terminal which is separated is unable to generate control flow with the controller, it is in a state where an access request is impossible. As a result, because the access of the terminal which is separated is blocked by the access control application 201 and the gateway 300, it may be perfectly separated from the network. Furthermore, the controller 100 may register a terminal, a continuous threat of which is detected according to a blacklist policy, with a blacklist and may deny generation of control flow, when the corresponding terminal requests controller access. Because it is unable to generate a tunnel between the terminal and the gateway in the state where there is no control flow, the terminal may be perfectly separated from the network.

Figure 6:
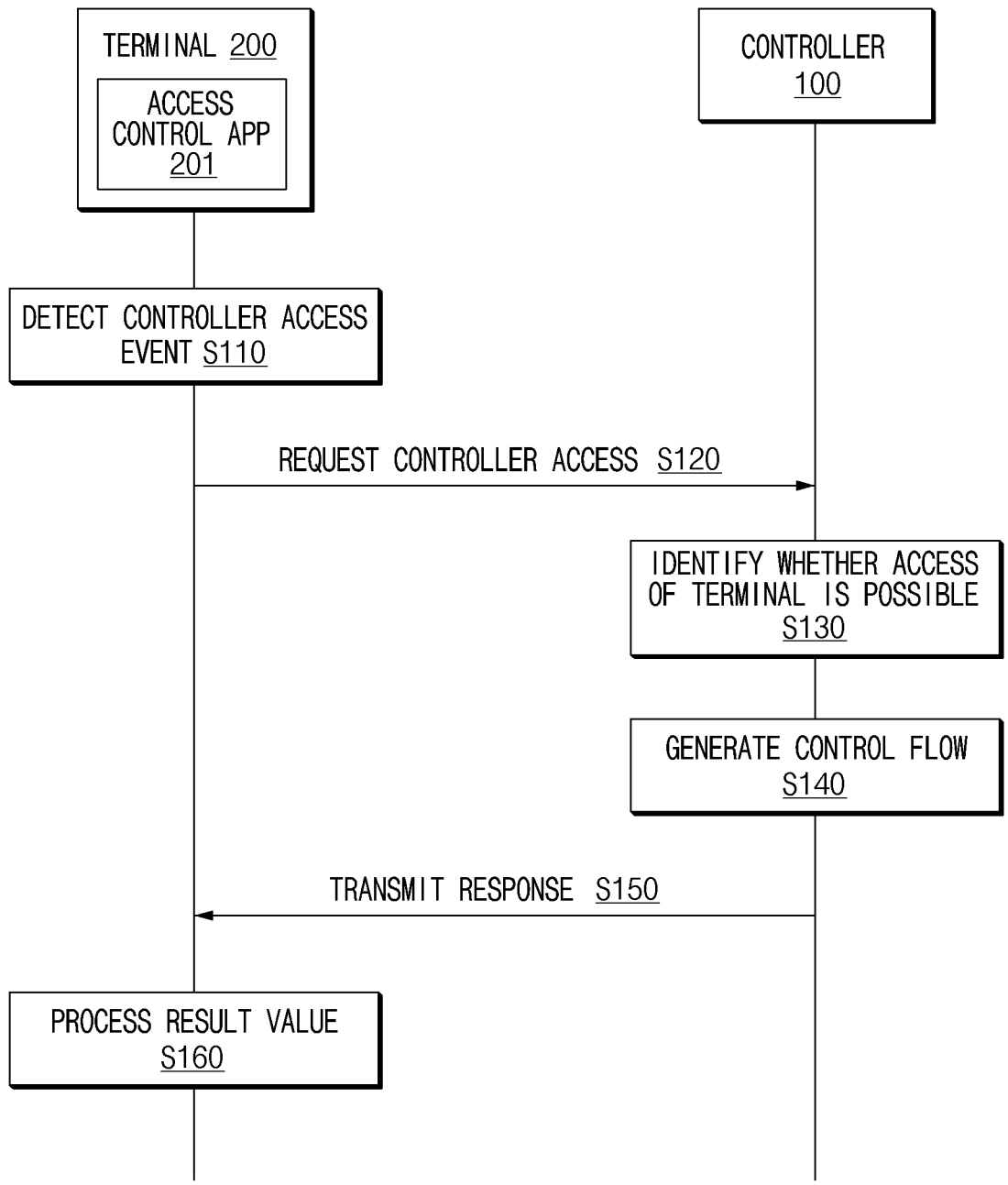
FIG. 6 is a signal sequence diagram illustrating a controller access process according to various embodiments.
Figure 7:
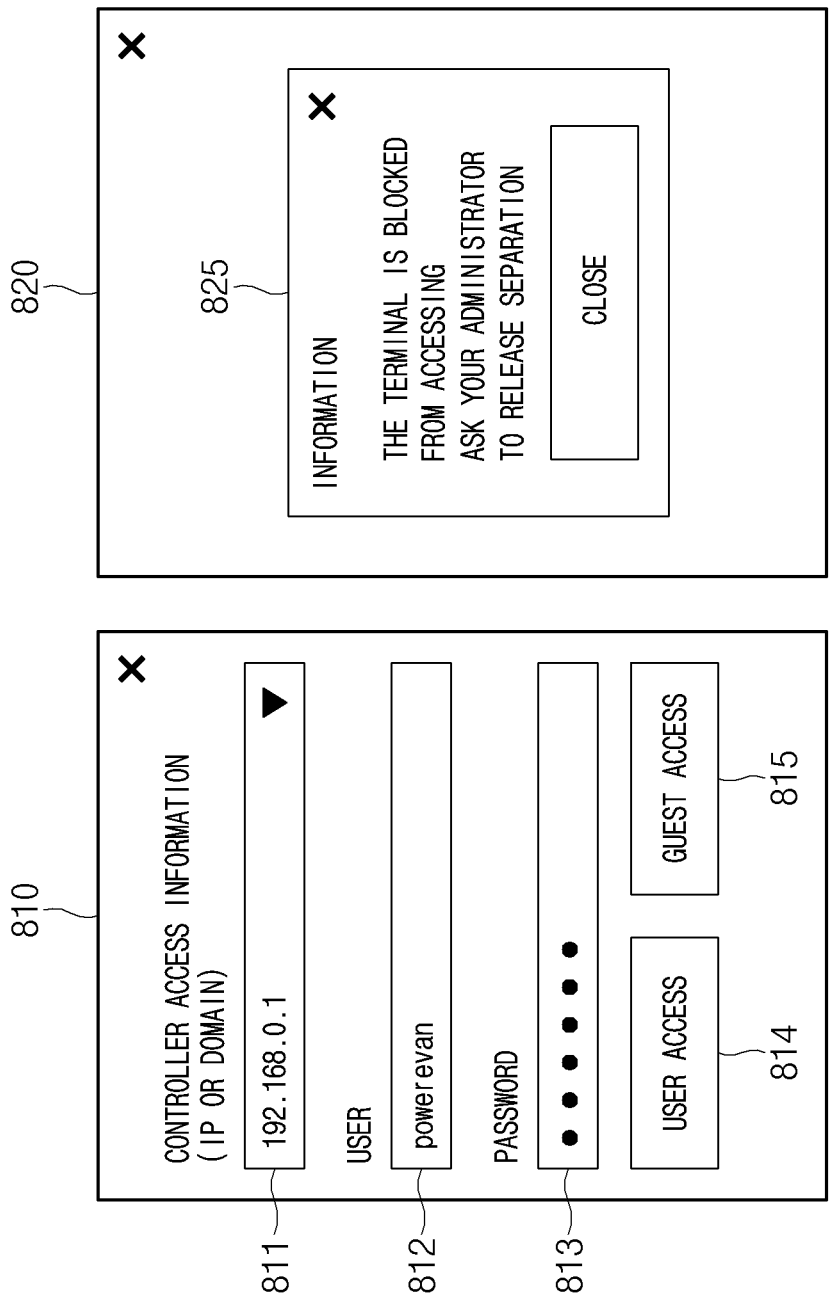
FIG. 7 illustrates a user interface screen for controller access according to various embodiments.

FIG. 6 is a signal sequence diagram illustrating a controller access process according to various embodiments. FIG. 7 illustrates a user interface screen for controller access according to various embodiments.

In S110, a terminal 200 may detect a controller access event. An access control application 201 is installed and run in the terminal 200, and the terminal 200 may detect that access to a controller 100 is requested by means of the access control application 201.

As an example, referring to FIG. 7, when the access control application 201 is run, the terminal 200 may display a user interface screen 810 for receiving necessary information for controller access. The user interface screen 810 may include an input window 811 for inputting an IP or a domain of the controller 100, an input window 812 for inputting a user ID, and/or an input window 813 for inputting a password. By receiving a signal matched to a button 814 for controller access of an authenticated user after pieces of information about the input windows 811 to 813 are input, the terminal 200 may detect a controller access event. As another example, when the user authentication of the terminal 200 is not completed yet, the terminal 200 may detect the controller access event by receiving a signal matched to a button 815 for controller access of an unauthorized user (i.e., a guest).

In S120, the terminal 200 may request controller access from the controller 100 in response to detecting the controller access event. The access control application 201 of the terminal 200 may transmit controller access request information. The controller access request information may include terminal identification information (e.g., a terminal ID, an IP address, a MAC address, and/or the like), a terminal type, a terminal location, a terminal environment (version), identification information of a network to which the terminal 200 belongs, and/or identification information of the access control application 201.

In S130, the controller 100 may identify whether access of the terminal 200 is possible in response to the received request. The controller 100 may identify whether the access of the terminal 200 is possible based on a database included in a memory 105 of the controller 100. For example, the controller 100 may identify whether the terminal 200 is in an accessible state by an access policy based on the controller access request information received from the access control application 201 and whether the identification information of the terminal 200 and/or the network to which the terminal 200 belongs is included in a blacklist database 135.

According to another embodiment, the controller 100 may identify whether previously generated control flow is present in a control flow table using terminal identification information (e.g., a terminal ID, an IP address, a MAC address, and/or the like). When the previously generated control flow is present, the controller 100 may regard the previously generated control flow as zombie control flow to perform a release procedure for the previously generated control flow. Furthermore, when the previously generated control flow is present in the control flow table, the controller 100 may determine that terminal access is impossible.

When it is determined that the controller access of the terminal 200 is possible in S130, the controller 100 may generate control flow between the terminal 200 and the controller 100 (S140). In this case, the controller 100 may generate control flow identification information, that is, a control flow ID, in the form of a random number and may add (store) the identification information of the terminal 200 and/or the network to which the terminal 200 belongs to the control flow table. Information (e.g., control flow identification information and/or control flow information) stored in the control flow table may be used to authenticate a user of the terminal 200, update information of the terminal 200, identify a policy for network access of the terminal 200, and/or check validity.

According to another embodiment, the controller 100 may determine that access of the terminal 200 is impossible. For example, when the identification information of the terminal 200 and/or the network to which the terminal 200 belongs is included in the blacklist database, the controller 100 may determine that the access of the terminal 200 is impossible. In this case, the controller 100 may fail to generate the control flow in S140.

The controller 100 may transmit a response to the controller access request to the terminal 200 (S150). When the access of the terminal 200 is granted, the controller 100 may transmit a response data packet including response code information (i.e., an access complete state) about an access request of the terminal 200, a control flow ID, policy information (e.g., a threat detection policy or access policy information) of the terminal 200, validity check information, and the like to the terminal 200. The access complete state may be divided into being normal and abnormal. The control flow ID may be used to identify control flow when user authentication of the terminal is requested and when terminal information is continuously updated. When the access of the terminal 200 is not granted, the controller 100 may transmit a response data packet including inaccessible information of the terminal 200 to the terminal 200.

In S160, the terminal 200 may process a result value depending on the received response.

According to an embodiment, when the response indicates that the controller access request is granted, the access control application 201 may store the received control flow identification information and may display a user interface screen indicating that the controller access is completed to a user.

According to another embodiment, when receiving the response indicating that the access of the terminal 200 is impossible, the terminal 200 may output a user interface screen indicating that controller access is impossible to the user. For example, referring to FIG. 7, the terminal 200 may display a user interface screen 820 by means of the access control application 201. The user interface screen 820 may indicate that access of the terminal 200 is blocked and may include a user interface 825 guiding separation release through a manager (e.g., the controller 100).

FIG. 6 illustrates the controller access procedure performed using the independently executable access control application 201 by the terminal 200. However, the terminal 200 according to other embodiments may perform the controller access procedure using an application including a module which performs network access control.

Figure 8:
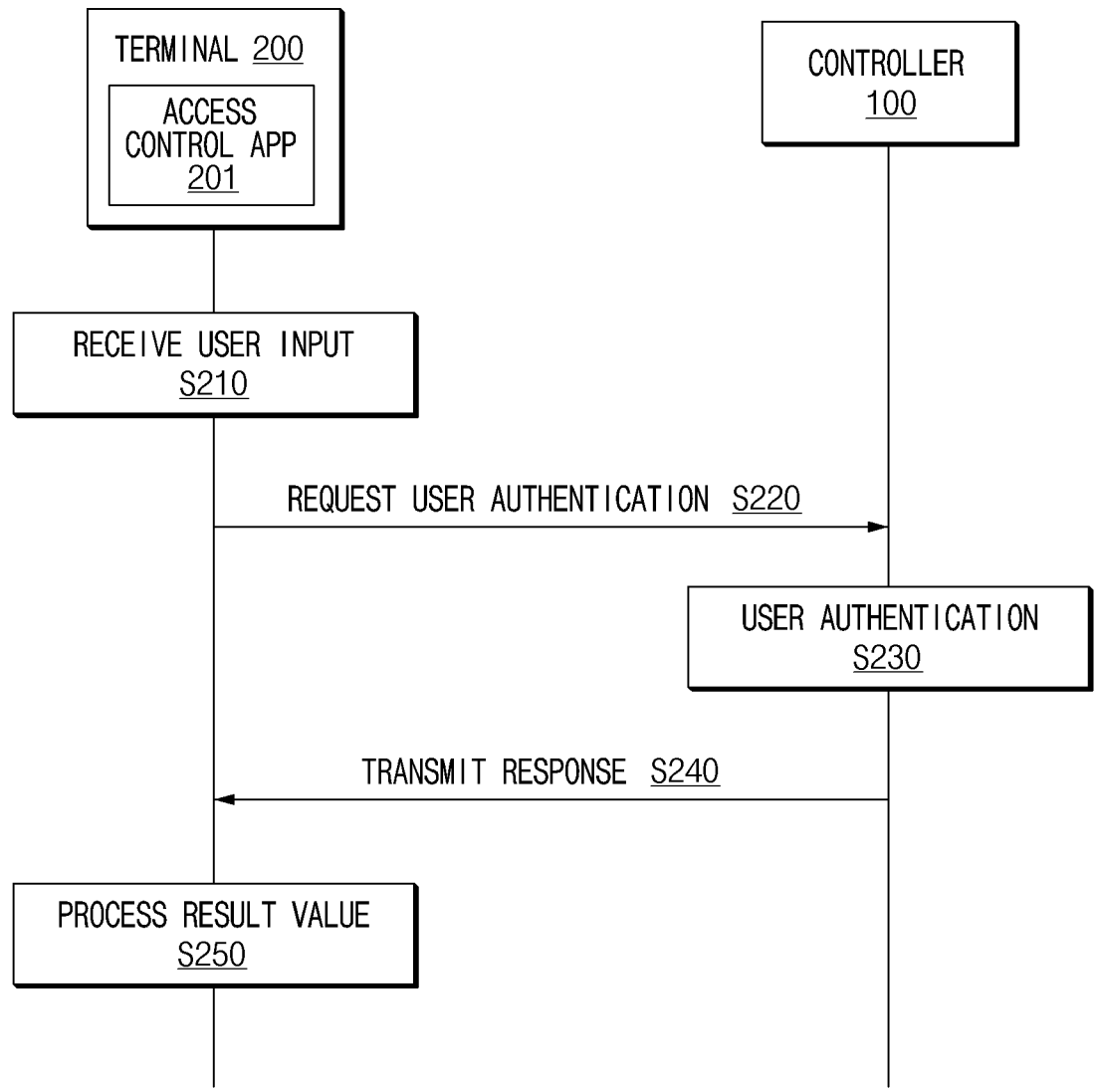
FIG. 8 is a signal sequence diagram illustrating a user authentication process according to various embodiments.

FIG. 8 is a signal sequence diagram illustrating a user authentication process according to various embodiments.

For a terminal 200 to obtain detailed access right for a destination network, an access control application 201 of the terminal 200 may receive authentication for a user of the terminal 200 from a controller 100.

Referring to FIG. 8, in S210, the terminal 200 may receive an input for user authentication. The input for the user authentication may be, for example, a user input inputting a user ID and a password. For another example, the input for the user authentication may be a user input (e.g., biometric information) for more reinforced authentication. For another example, the reinforced authentication method may include multi factor authentication (MFA).

In S220, the terminal 200 may request user authentication from the controller 100. For example, the access control application 201 may transmit action code information to request the controller 100 and input information for user authentication (user authentication information or authentication request information) to the controller 100. When control flow between the terminal 200 and the controller 100 is generated in advance, the access control application 201 may transmit user authentication information together with control flow identification information.

In S230, the controller 100 may perform user authentication based on the information received from the terminal 200.

For example, the controller 100 may identify validity of control flow based on whether the control flow identification information included in the received information is present in a control flow table of the controller 100. When the control flow is not valid, the controller 100 may fail to grant user authentication.

For another example, when receiving a control data packet transmitted in a form such as a similar tunneling technology, the controller 100 may check integrity of the control data packet (e.g., whether the data packet is forged or falsified or the like) and a variety of validity to check whether the request of the terminal 200 is valid. When the request of the terminal 200 is not valid, the controller 100 may perform a control flow release procedure and may return authentication request failure information to the terminal 200.

When the control flow is valid, the controller 100 may determine whether a user is accessible depending on an access policy and whether the user is included in a blacklist, based on received user authentication information (e.g., a user ID, a password, and/or reinforced authentication information) and a database (e.g., an access policy database 1051 or a blacklist database 1054 of FIG. 3) included in a memory of the controller 100. When the user authentication information does not meet an access policy or is included in a blacklist, the controller 100 may fail to grant user authentication. When the user authentication information is included in the blacklist, the controller 100 may transmit inaccessible Information to the terminal 200, may perform a procedure of releasing previously generated control flow, and may return authentication failure information.

When the user is authenticated, the controller 100 may add identification information (e.g., a user ID) of the user to identification information of control flow. The added user identification information may be used for controller access or network access of the authenticated user. When the terminal 200 uses multiple pieces of identification information when requesting network access, the controller 100 may provide a hierarchical right policy check method for each terminal, each user, and each network and may be linked with pieces of identified information (e.g., a terminal ID, an IP address, a MAC address, a user ID, and the like) when detecting various threats to perform collective access release and blacklist processing.

In S240, the controller 100 may transmit information indicating that the user is authenticated as a response to the user authentication request to the terminal 200. The controller 100 may return an authentication complete state and access policy information of the authenticated user as the result of the user authentication to the terminal 200. The controller 100 may return the authentication complete state and the access policy information of the authenticated user (i.e., access policy information mapped to user information) to the terminal 200.

In S250, the terminal 200 may process a result value for the user authentication request. For example, the terminal 200 may display a user interface screen indicating that the user authentication is completed to the user. For another example, when information indicating that the user authentication is impossible is received in the terminal 200, in S250, the terminal 200 may display a user interface screen indicating that the user authentication fails.

Figure 9:
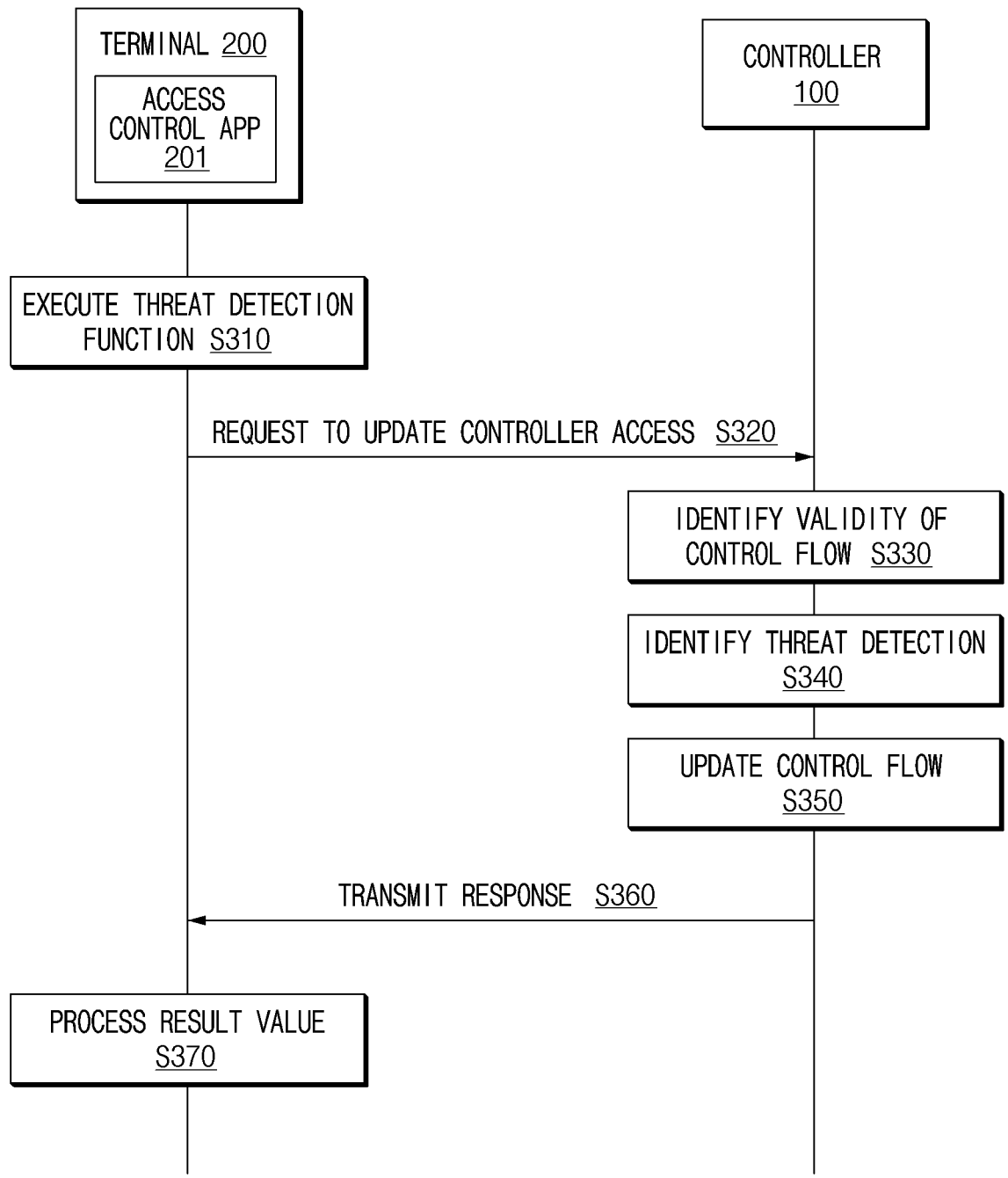
FIG. 9 is a signal sequence diagram illustrating a process of updating controller access according to various embodiments.

FIG. 9 is a signal sequence diagram illustrating a process of updating controller access according to various embodiments.

To maintain control flow after controller access is granted, an access control application 201 of a terminal 200 may perform a controller access update procedure on a periodic basis. Because of transmitting whether the terminal 200 is currently and normally operating and whether a detected threat is present, the controller access update procedure may allow the terminal 200 to maintain network access in a state which is always safe and valid.

In S310, the terminal 200 may execute a threat detection function at a predetermined controller access update period. The access control application 201 of the terminal 200 may be loaded with a function for detecting a series of threats for attacking or bypassing the access control application 201 to access a network, that is, a threat detection function. The access control application 201 may perform the threat detection function which should be executed, based on a threat detection policy received from the controller 100. Herein, the threat detection function may detect a direct threat element, such as memory forgery or falsification of the access control application 201, application forgery or falsification, forgery or falsification of terminal identification information, or forgery or falsification of a honey pot and an access target application (e.g., an application 202), and/or an indirect threat element, such as debugger running and compulsory process end processing.

After executing the threat detection function, in S320, the terminal 200 may request the controller 100 to update controller access. The access control application 201 may transmit a request data packet including threat detection result information and information (e.g., a control flow ID) necessary to update controller access to the controller 100.

In S330, the controller 100 may identify control flow validity based on access update information received from the terminal 200. The controller 100 may identify validity of control flow based on whether the control flow identification information included in the received access update information is present in a control flow table of the controller 100. When control flow matched to the control flow identification information included in the access update information is not present in the control flow table, the controller 100 may fail to grant update of the control flow. Furthermore, the controller 100 may transmit update failure information to the terminal 200.

For another example, when control flow is not updated or is greater than a control flow update time (e.g., an expire time), when a threat is detected in the control flow internally or by another threat detection system, or when the control flow is released by a manager, the controller 100 may immediately remove the corresponding control flow from a control flow table. Thus, invalid control flow may be processed as a state where network access is impossible. Furthermore, when control flow is not valid, the controller 100 may regard the access control application 201 of the terminal 200 as being ended or may regard the terminal 200 as not being present on a network to release access of the terminal 200.

For another example, when receiving a control data packet transmitted in a form such as a similar tunneling technology, the controller 100 may check integrity of the control data packet (e.g., whether the data packet is forged or falsified or the like) and a variety of validity to check whether the request of the terminal 200 is valid. When the request of the terminal 200 is not valid, the controller 100 may perform a control flow release procedure and may transmit update failure information to the terminal 200.

In S340, the controller 100 may identify whether a threat detected by the terminal 200 is present based on threat detection result information included in access update information received from the terminal 200. When the control flow is valid, the controller 100 may identify whether the result of detecting threat elements defined in a threat detection policy is present in detection result information transmitted by the access control application 201. Herein, at least one threat element (e.g., a target threat) the access control application 201 should identify using a threat detection function is defined in the threat detection policy.

When the result of detecting the threat element defined in the threat detection policy is omitted in the detection result information received from the terminal 200, the controller 100 may perform a control flow release procedure and may transmit a packet guiding update failure to the terminal 200. Furthermore, when a threat is detected from the received detection result information (the threat detection information), the controller 100 may immediately release access of the terminal 200 based on the threat detection policy to block all network access. When having to release access of the terminal 200, the controller 100 may perform a control flow release procedure and may transmit update failure information to the terminal 200.

When the threat is not detected, in S350, the controller 100 may update control flow. The controller 100 may update a last update time of the control flow to a current time. Furthermore, the controller 100 may transmit policy information which should be updated to the terminal 200.

In S360, the controller 100 may transmit a response to the access update request to the terminal 200. The controller 100 may transmit the 'normal' as a response, when the access update is completed, and may transmit the 'abnormal' as a response, when the access update fails.

In S370, the terminal 200 may process a result value for the access update request. When information indicating that the access update is completed is received, the terminal 200 may waits during a predetermined time and may return to S310 to start to update controller access. When information indicating that the access update fails is received, the terminal 200 may display a user interface screen indicating access update failure.

Figure 10:
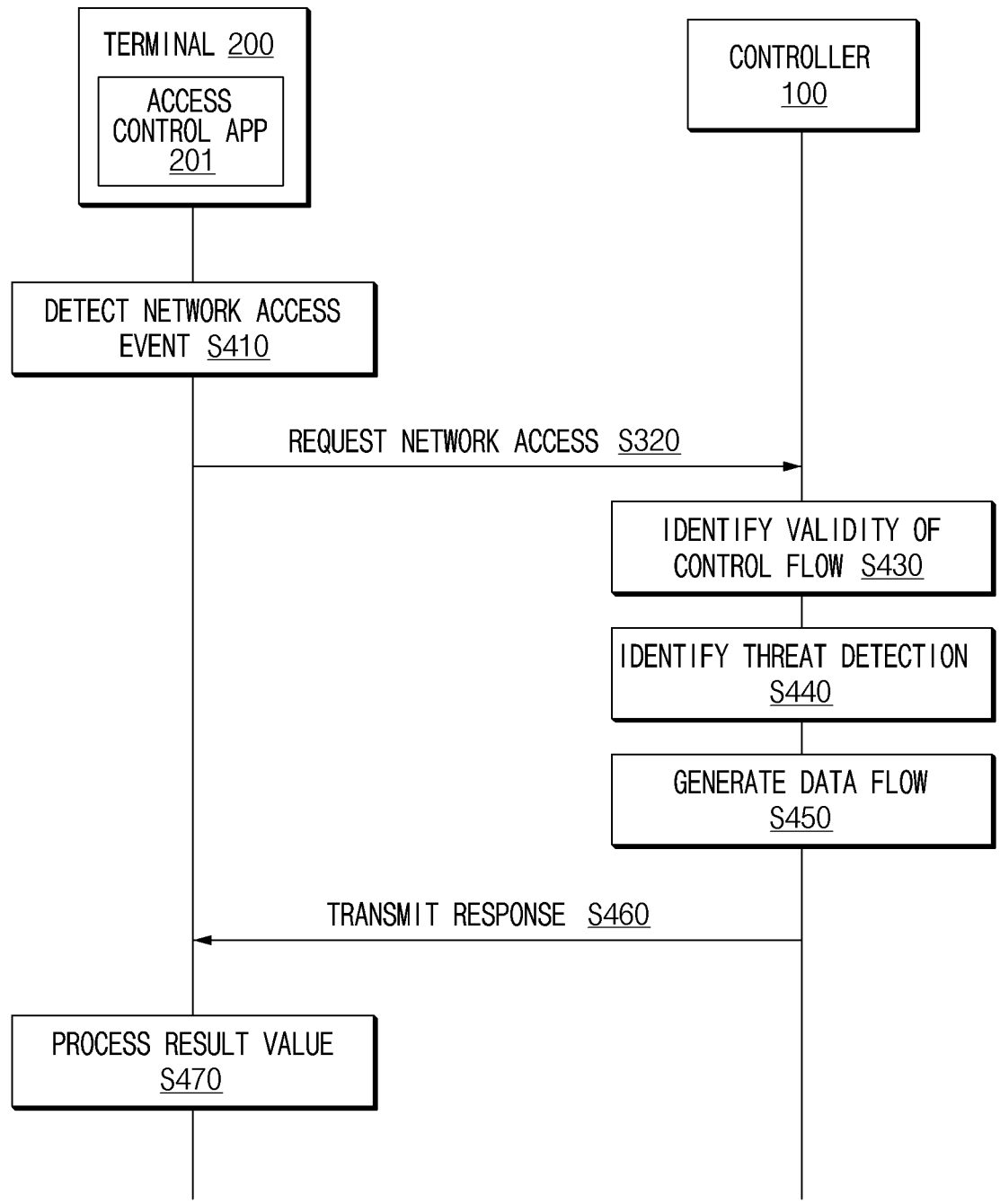
FIG. 10 is a signal sequence diagram illustrating a process of controlling network access according to various embodiments.
Figure 11A:
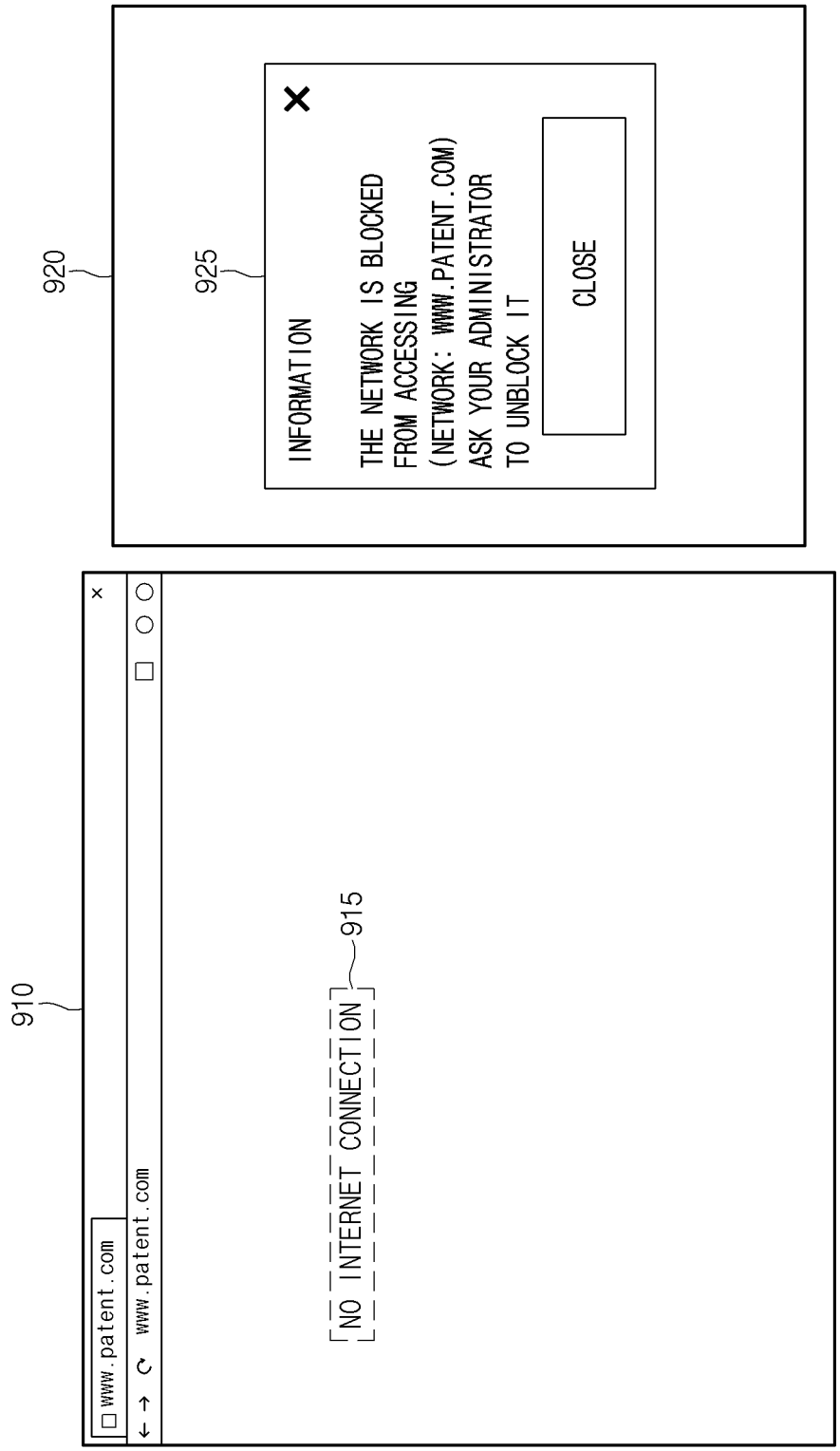
FIG. 11A illustrates a user interface screen indicating that network access is blocked.
Figure 11B:
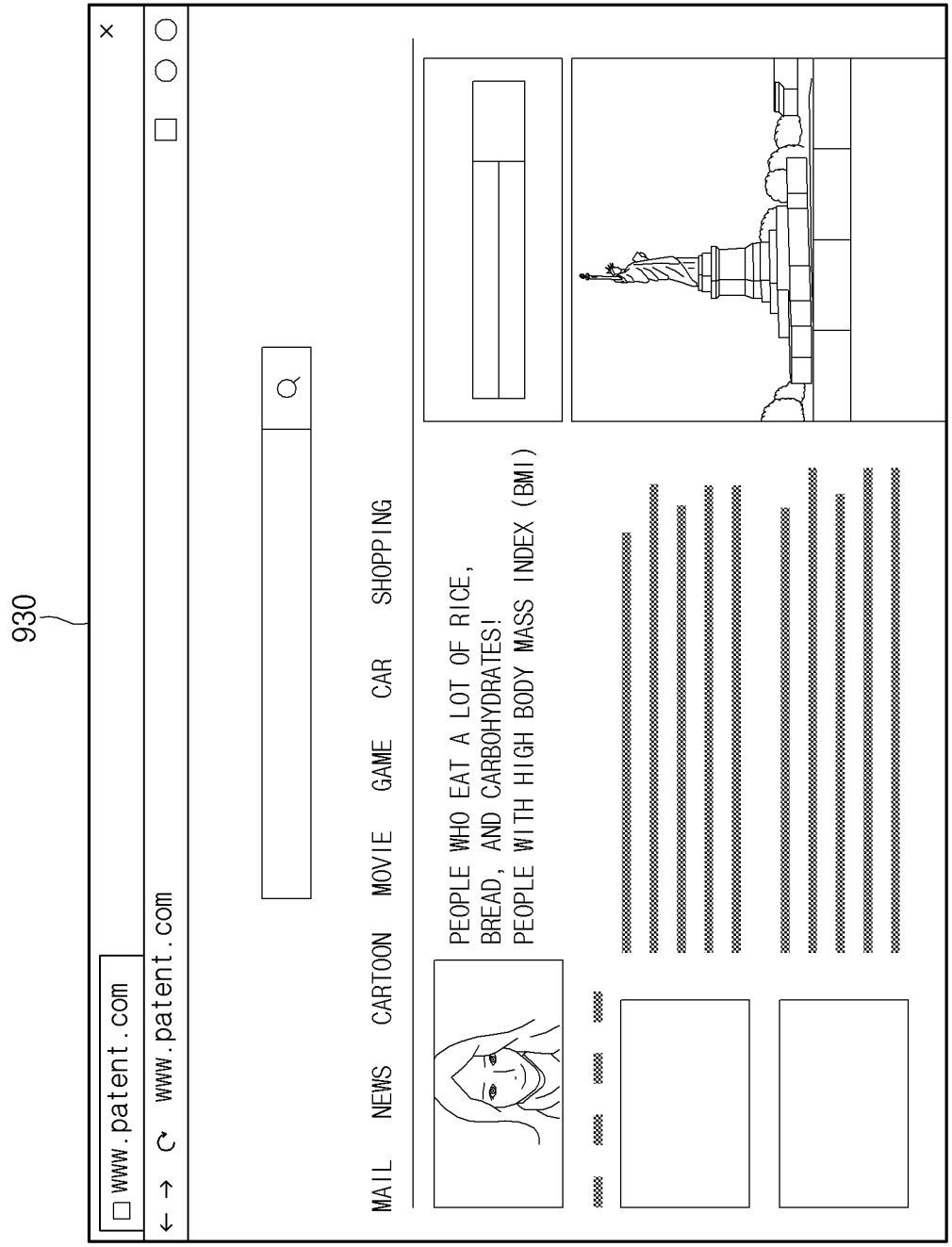
FIG. 11B illustrates a user interface screen indicating that network access is granted.

FIG. 10 is a signal sequence diagram illustrating a process of controlling network access according to various embodiments. FIG. 11A illustrates a user interface screen indicating that network access is blocked. FIG. 11B illustrates a user interface screen indicating that network access is granted.

After a terminal 200 is authorized from a controller 100, it may control network access of other applications stored in the terminal 200 by means of an access control application 201 of the terminal 200 to ensure trusted data transmission.

Referring to FIG. 10, in S410, the terminal 200 may detect a network access event. The access control application 201 of the terminal 200 may detect the network access event which occurs in an application 202. In other words, the access control application 201 may detect that the application 202 such as a web browser attempts to access a destination network such as the Internet. For example, a user may input and call a web address to run and access the web browser.

In S420, the access control application 201 may request network access of the application 202 from the controller 100. In this case, the access control application 201 may transmit identification information or an execution file name of the application 202, a destination IP (an IP of an access target), and service port information together with identification information of control flow generated between the controller 100 and the terminal 200 to the controller 100.

According to another embodiment, when there is data packet flow (e.g., data flow) corresponding to the identification information or the execution file name of the application 202, the destination IP, and/or the service port information, the access control application 201 may not perform subsequent operations to transmit a data packet of the application 202 to a gateway 300 through an authorized tunnel.

Although not illustrated in FIG. 10, the access control application 201 may check integrity and safety of the application 202, before requesting network access. For example, the access control application 201 may perform whether the application is forged or falsified, code signing check, and/or fingerprint check. When it fails in checking the integrity and the safety, the access control application 201 may drop the data packet of the application 202 and may fail to perform subsequent operations. When it succeeds in checking the integrity and the safety, the access control application 201 may perform S420.

In S430, the controller 100 may identify control flow validity based on the received request. The controller 100 may identify the validity of the control flow based on whether identification information of the control flow, which is included in information where network access is requested, is present in a control flow table of the controller 100. When the control flow is not valid, the controller 100 may fail to grant network access.

For another example, when receiving a control data packet transmitted in a form such as a similar tunneling technology, the controller 100 may check integrity of the control data packet (e.g., whether the data packet is forged or falsified or the like) and a variety of validity to identify whether the request of the terminal 200 is valid. When the request of the terminal 200 is not valid, the controller 100 may perform a control flow release procedure and may fail to grant network access of the terminal 200.

In S440, the controller 100 may identify whether a threat is detected based on threat detection result information transmitted from the access control application 201. When it is identified that the threat is detected from the threat detection result information, the controller 100 may perform a control flow release procedure for releasing access of the terminal 200 depending on a threat detection policy and may fail to grant network access of the terminal 200.

When the control flow is valid and the threat is not detected, in S450, the controller 100 may generate control flow. The controller 100 may whether identification information (e.g., identification information of the application, an access target IP, service port information, and the like) of the terminal 200 which requests access is included in an access policy matched with identified information (e.g., identification information of the terminal, a user ID, source network information, or the like) on the control flow and whether access is possible. When the access is impossible, the controller 100 may fail to grant network access of the terminal 200. When the access is possible, the controller 100 may identify whether there are a tunnel and data flow connected between the terminal 200 and a gateway 300 which is present between network boundaries. When the tunnel is not present, the controller 100 may respectively transmit tunnel generation information and data flow information (data packet flow information) to the terminal 200 and the gateway 300. When the tunnel is present, the controller 100 may transmit data flow information including information for using a previous tunnel to the terminal 200 and may also transmit the data flow information to the gateway 300 if necessary.

In S460, the controller 100 may transmit a response to the network access request to the terminal 200.

In S470, the terminal 200 may process a result value for the network access request. According to an embodiment, when receiving the information that the network access of the application 202 is impossible or the information that there is no authorized tunnel, the access control application 201 may drop a data packet and may output a user interface screen indicating that the network access is impossible. For example, referring to FIG. 11A, the terminal 200 may output a user interface screen 910 or 920 indicating that access to the destination network is blocked on its display. The user interface screen 910 or 920 may include text 915 or a pop-up window 925 indicating that the access is blocked.

According to another embodiment, when information necessary to generate a tunnel (tunnel generation information) is received from the controller 100, the access control application 201 may request the gateway 300 to generate a tunnel based on the tunnel generation information to generate the tunnel therebetween and may transmit a data packet of the application 202 through the generated tunnel. In this case, the access control application 201 may receive a data packet from the destination network and may process data provided from the destination network. For example, referring to FIG. 11B, the terminal 200 may output a screen 930 provided from a destination network (e.g., a web site), access of which is granted, on the display. When it fails in generating the tunnel, the controller 100 may pause a network access procedure.

According to another embodiment, when receiving a tunnel ID of a tunnel which is present in advance from the controller 100, the access control application 201 may fail to perform an additional tunnel generation procedure and may transmit a data packet of the application 202 to the gateway 300 through the tunnel corresponding to the tunnel ID.

When S410 to S470 are normally processed, the terminal 200 may update the data flow information received from the controller 100 and may transmit a data packet to an authorized tunnel.

When the threat is detected upon the network access request, the controller 100 may immediately release the control flow and may block network access by an access target application (e.g., the application 202), the threat of which is detected, such that the threat is not transmitted to an access target network (e.g., a destination network).

Figure 12:
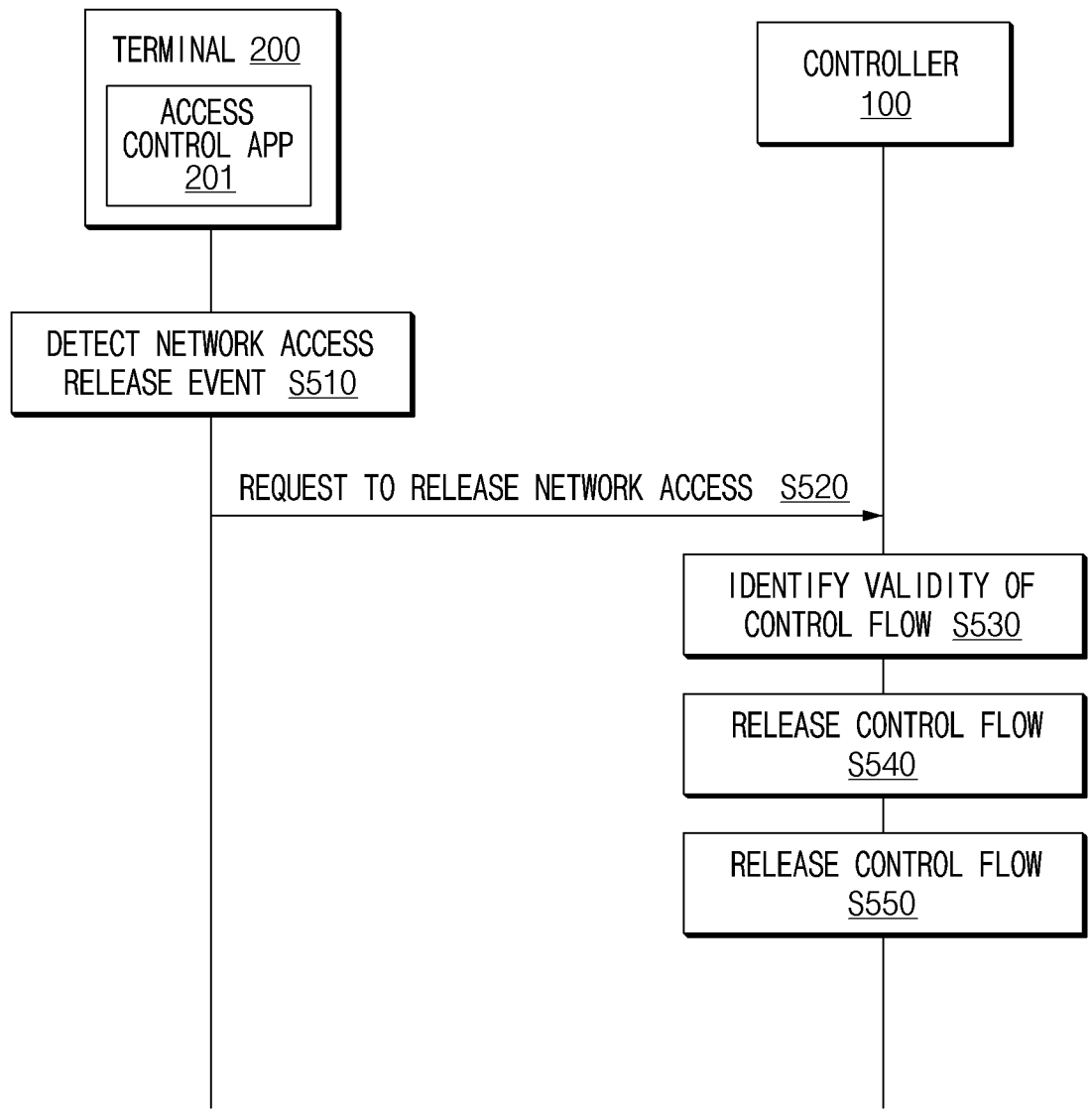
FIG. 12 is a signal sequence diagram illustrating a process of releasing network access according to various embodiments.
Figure 13:
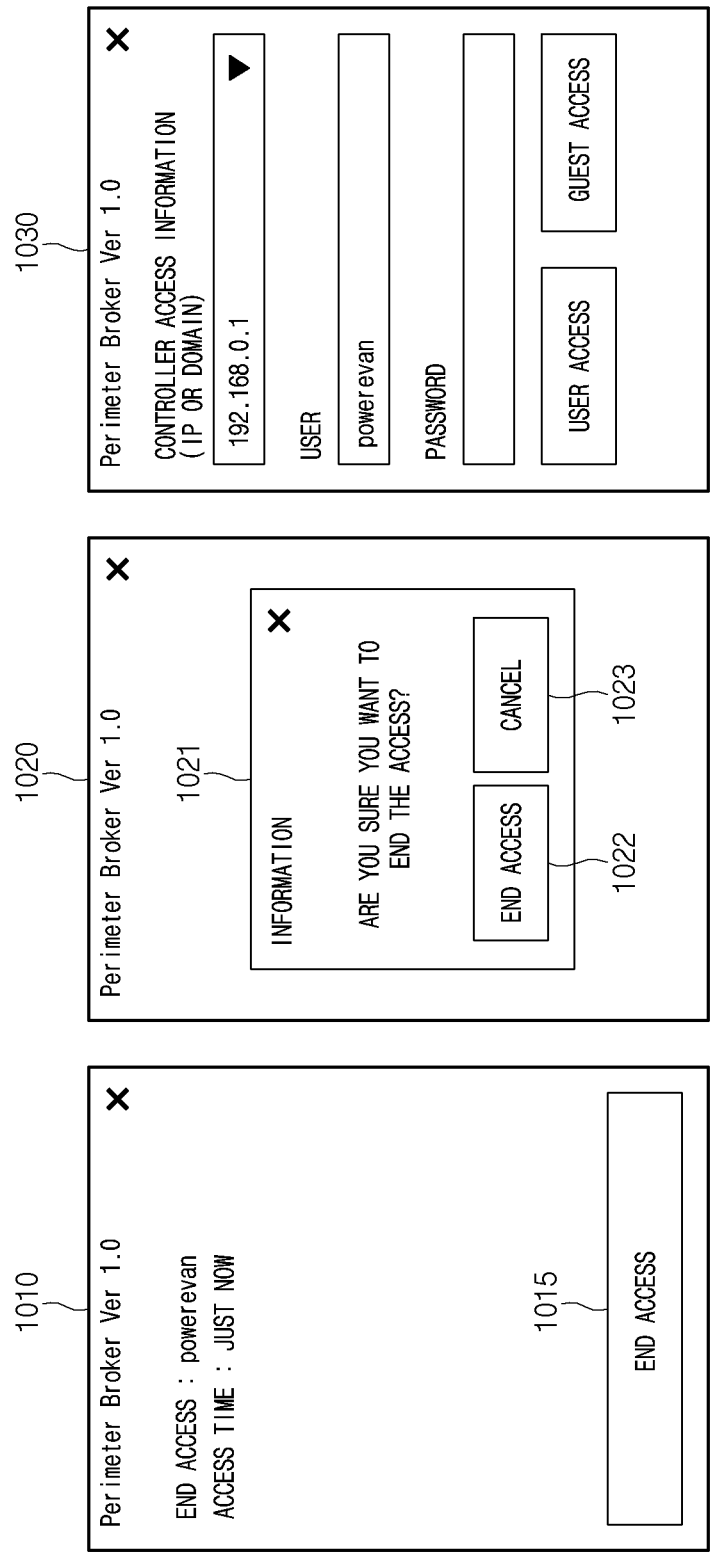
FIG. 13 illustrates a user interface screen for releasing network access according to various embodiments.

FIG. 12 is a signal sequence diagram illustrating a process of releasing network access according to various embodiments. FIG. 13 illustrates a user interface screen for releasing network access according to various embodiments.

In S510, a terminal 200 may detect a network access release event. The terminal 200 may detect an access end request generated by an access control application 201 or may detect an event which occurs when the terminal 200 resumes or ends.

When detecting the network access release event, in S520, the terminal 200 may request a controller 100 to release network access. When control flow is formed with the controller 100, the access control application 201 may request the controller 100 to release network access. When requesting to release the access, the terminal 200 may transmit control flow identification information and access release request information.

In S530, the controller 100 may identify validity of the control flow based on the network access release request information received from the terminal 200. The controller 100 may identify the validity of the control flow based on whether a control flow ID included in the network access release request information is present in a control flow table. When the control flow is not valid, the controller 100 may pause the present step.

For another example, when receiving a control data packet transmitted in a form such as a similar tunneling technology, the controller 100 may check integrity of the control data packet (e.g., whether the data packet is forged or falsified or the like) and a variety of validity to identify whether the request of the terminal 200 is valid. When the request of the terminal 200 is not valid, the controller 100 may perform a control flow release procedure and may pause the present step.

When the control flow is valid, in S540, the controller 100 may perform the control flow release procedure. The controller 100 may search the control flow table for control flow information and may remove the control flow information based on control flow identification information included in the network access release request information received from the terminal 200.

For example, referring to FIG. 13, when network access is completed, the access control application 201 of the terminal 200 may output an access complete screen 1010 on a display 240 such that a user may recognize access completion. When an access end button 1015 on the access complete screen 1010 is input, the terminal 200 may display an access release screen 1020. When a pop-up window 1021 querying about an access end intention of the user may be displayed on the access release screen 820. When an access end button 1022 of the pop-up window 1021 is selected, the terminal 200 may output a controller access screen 1030 (identical to 810 of FIG. 9) on the display 240. When a cancel button 1023 of the pop-up window 1021 is selected, the terminal 200 may maintain the controller access and may switch the access release screen 1020 to the access complete screen 1010.

According to another embodiment, when an internal network access release event occurs, the access control application 201 may request the controller 100 to release access, such that the previously generated tunnel and data packet flow information may be immediately removed, thus efficiently managing a life cycle for network access.

Figure 14:
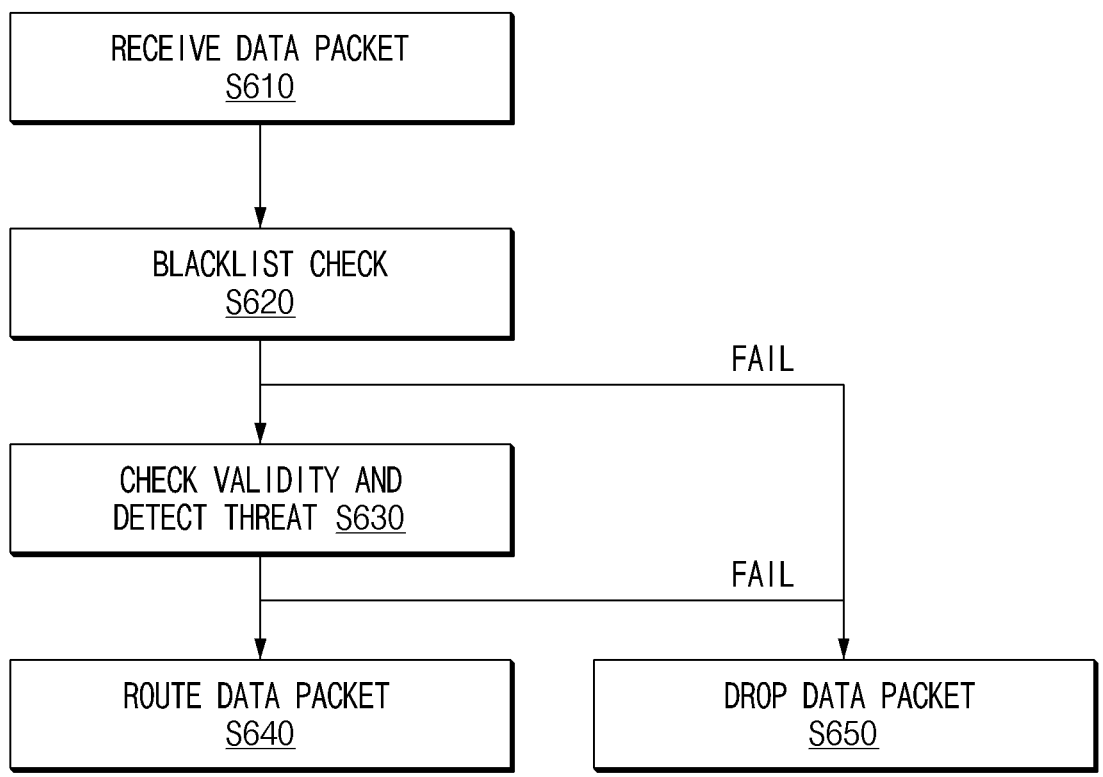
FIG. 14 is a flowchart illustrating a process of routing a data packet according to various embodiments.

FIG. 14 is a flowchart illustrating a process of routing a data packet according to various embodiments. Operations shown in FIG. 14 may be performed by a gateway 300.

The gateway 300 may be located between a terminal 200 and a network boundary to perform reception and processing of a data packet. The gateway 300 may be loaded with a threat detection function.

In S610, the gateway 300 may receive a data packet from the terminal 200. The gateway 300 may determine whether the received data packet is a control data packet based on a destination IP included in the received data packet and a structure of the data packet.

In S620, the gateway 300 may perform blacklist check to block access of an unauthorized terminal. The gateway 300 may identify whether a source IP address and/or a MAC address included in header information of the received data packet is included in a blacklist. When the source IP and/or the MAC address are/is included in the blacklist, the gateway 300 may drop a data packet received in S650. When the source IP and/or the MAC address are/is not included in the blacklist, the gateway 300 may perform S630.

In S630, the gateway 300 may identify whether the data packet is valid and whether a threat is detected. The gateway 300 may identify whether the received data packet is received through an authorized tunnel. The authorized tunnel may be a tunnel between the terminal 200 and the gateway 300, which is generated under control of a controller 100. The gateway 300 may identify whether a data flow header is present in the received data packet and whether the data flow header is valid. When receiving the control data packet, the gateway 300 may check validity for the control data packet and may detect a threat such as a continuous access attempt of an unauthorized target. When the data packet is received through an unauthorized tunnel, is an unauthorized data packet where there is no data flow header information, or is an abnormal data packet where data flow header information is not valid, and/or when the control data packet is not valid, the gateway 300 may drop a data packet received in S650. When the threat is detected, the gateway 300 may drop the data packet received in S650 and may store threat detection information in the form of a log.

When the received data packet is valid and when the threat is not detected, in S640, the gateway 300 may route the received data packet. The gateway 300 may forward the received data packet to a destination network based on a destination IP included in header information of the received data packet.

In the above-mentioned routing process, the gateway 300 may detect a threat and may store log information of the detected threat. The gateway 300 may transmit the stored threat detection log information to the controller 100 on a periodic basis. The threat detection log information may include a threat detection time, identification information (e.g., an IP address, a MAC address, or the like) of the threat detection terminal, and/or a threat type (data packet blocking reason). The controller 100 may analyze the threat detection log information transmitted from the gateway 300 and may perform a control flow release procedure, when access of the terminal should be released by a threat detection policy. The controller 100 may immediately remove control flow of a terminal which bypasses the access control application 201 or performs a direct target network attack. Furthermore, the gateway 300 may fundamentally separate the terminal, the threat of which is detected, based on a blacklist provided from the controller 100 to block a continuous threat.

Figure 15:
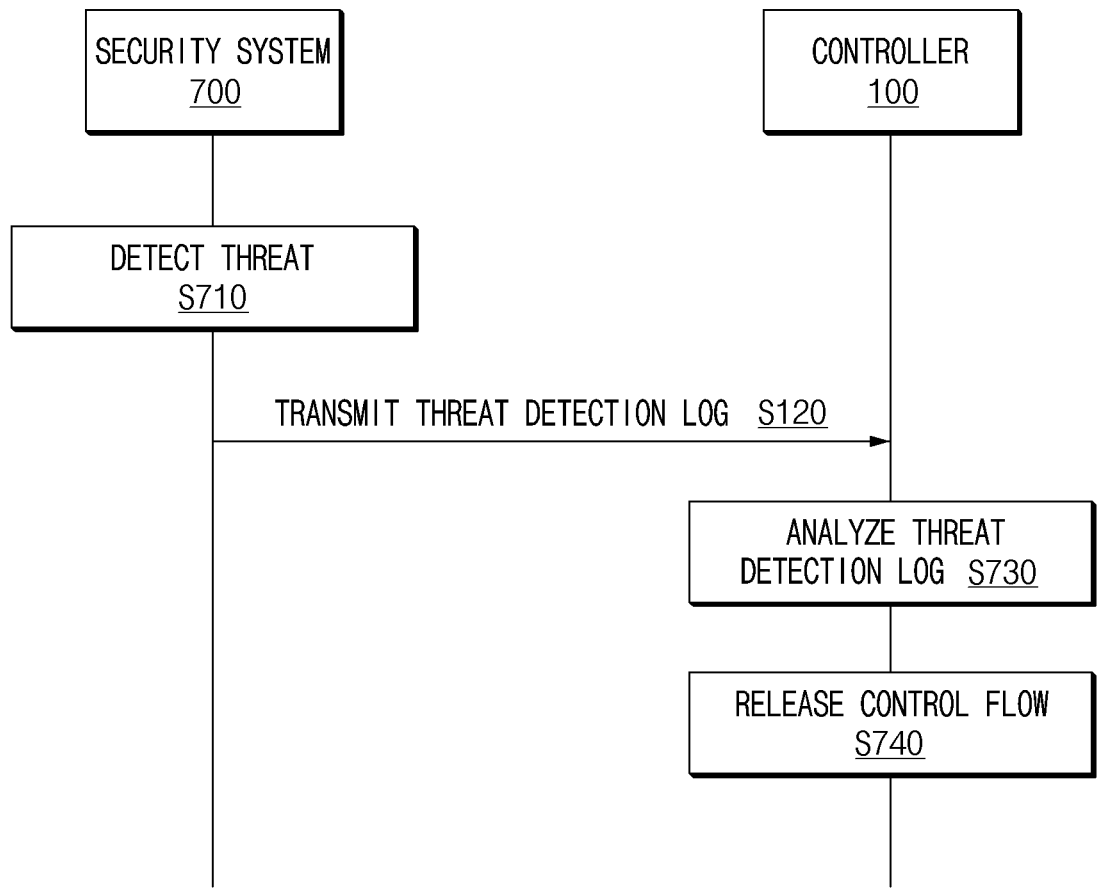
FIG. 15 is a signal sequence diagram illustrating a threat detection process according to various embodiments.
Figure 16:
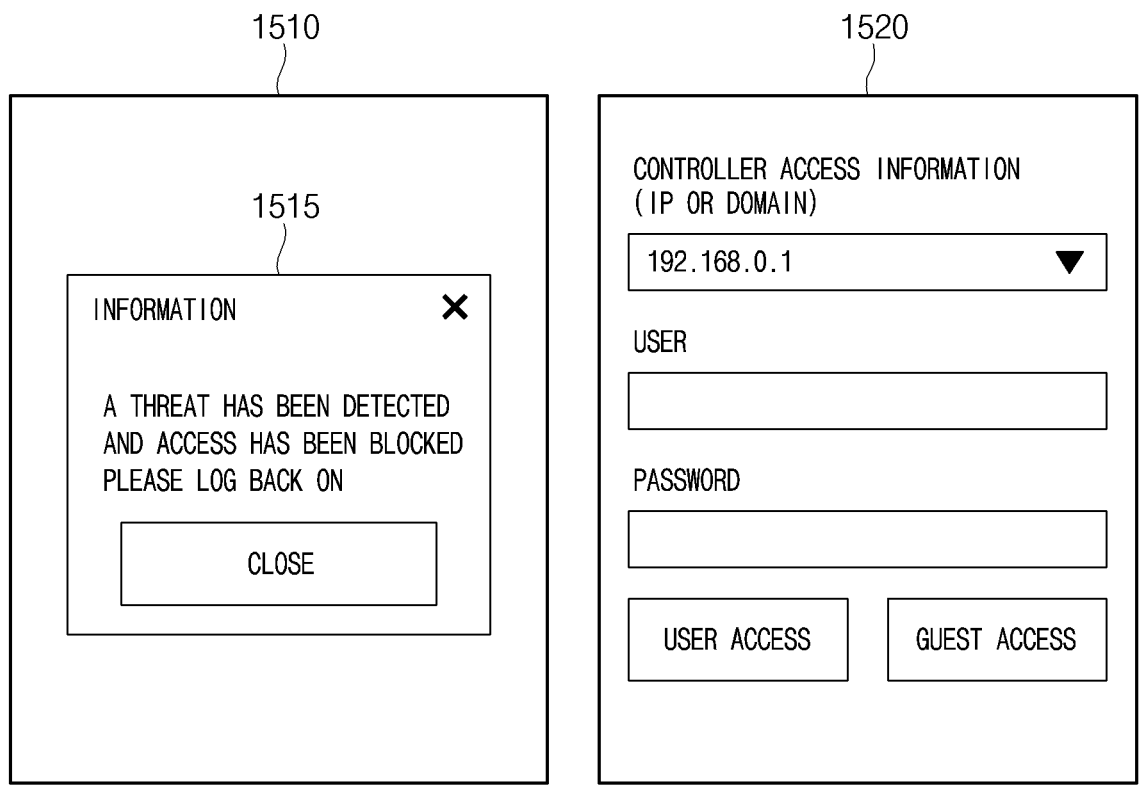
FIG. 16 illustrates a user interface screen indicating that access is ended according to threat detection according to various embodiments.

FIG. 15 is a signal sequence diagram illustrating a threat detection process according to various embodiments. FIG. 16 illustrates a user interface screen indicating that access is ended according to threat detection according to various embodiments.

A terminal security system 110 and a network security system 400 may detect a terminal threat and a network threat using respective threat detection techniques. The terminal security system 110 and the network security system 400 may transmit respective threat detection information and terminal identification information to the controller 100 and may release access of a terminal, a threat of which is detected, to separate the terminal, the threat of which is detected, depending on a blacklist policy. Hereinafter, the terminal security system 110 and the network security system 400 are collectively referred to as a security system 700, and the security system 700 will be described as a performance entity.

In S710, the security system 700 may detect terminal and network threats using a threat detection function loaded into the system. The security system 700 may generate and store information about the detected threat in the form of a log.

In S720, the security system 700 may transmit the threat detection log to the controller 100.

In S730, the controller 100 may analyze the threat detection log received from the security system 700. Based on the analyzed result, the controller 100 may determine a threat level of a terminal 200. The controller 100 may determine to release (block) access of the terminal 200 depending on the threat level based on a threat detection policy.

When it is determined to release the access of the terminal 200, in S740, the controller 100 may perform a procedure of releasing control flow mapped to identification information of the terminal 200 which is determined to release the access. The controller 100 may add the identification information of the terminal 200, the access of which is released, to a blacklist to block temporary or permanent access of the terminal 200.

Figure 17:
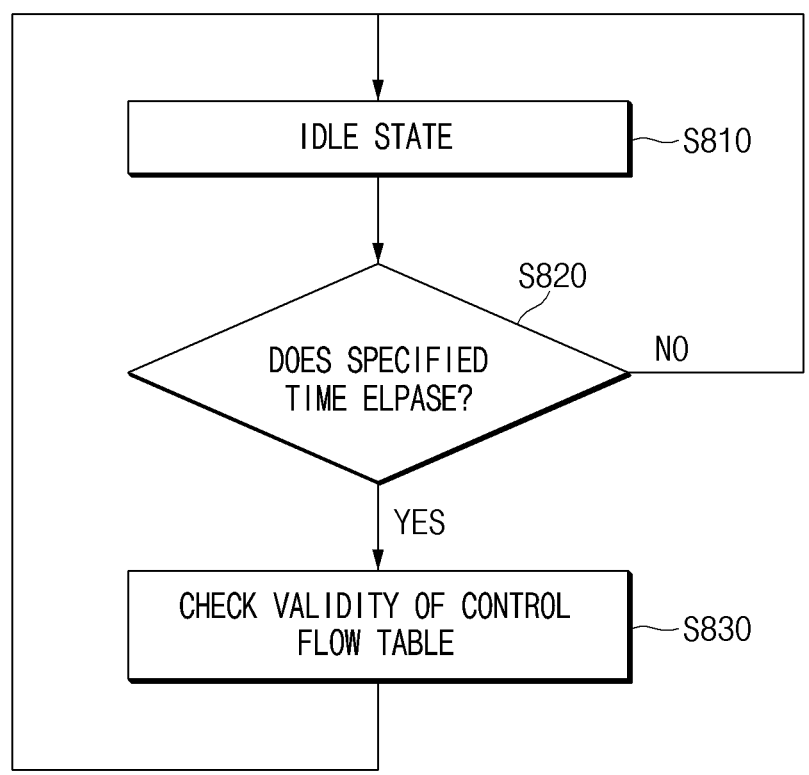
FIG. 17 illustrates an operational flowchart for checking validity of a control flow table in a controller according to various embodiments.

For example, referring to FIG. 16, the user interface screen 200 may output a user interface screen 1510 on its display. The user interface screen 1510 may include a user interface 1515 for notifying a user that the access is blocked and guiding the user to access it again. The terminal 200 may attempt to perform controller access again depending on a user input. For example, the terminal 200 may output a user interface screen 1520 and may attempt to perform controller access again based on information of the controller 100 and user information, which is received from the user interface screen 1520, FIG. 17 illustrates an operational flowchart for checking validity of a control flow table in a controller according to various embodiments. Operations shown in FIG. 17 may be performed by a controller 100 of FIG. 6.

In S810, the controller 100 may operate in an idle state.

In S820, the controller 100 may identify whether a specified time elapses. When the specified time does not elapse, the controller 100 may operate in the idle state in S810.

When the specified time elapses, in S830, the controller 100 may check validity of a control flow table. For example, the controller 100 may identify an update state and update expiration time of control flow information. When the control flow information is not updated or when the update expiration time elapses, the controller 100 may determine to release control flow.

After the validity check of the control flow table is completed, the controller 100 may operate again in the idle state in S810. Thereafter, when the specified time elapses, the controller 100 may perform validity check of the control flow table.

Figure 18:
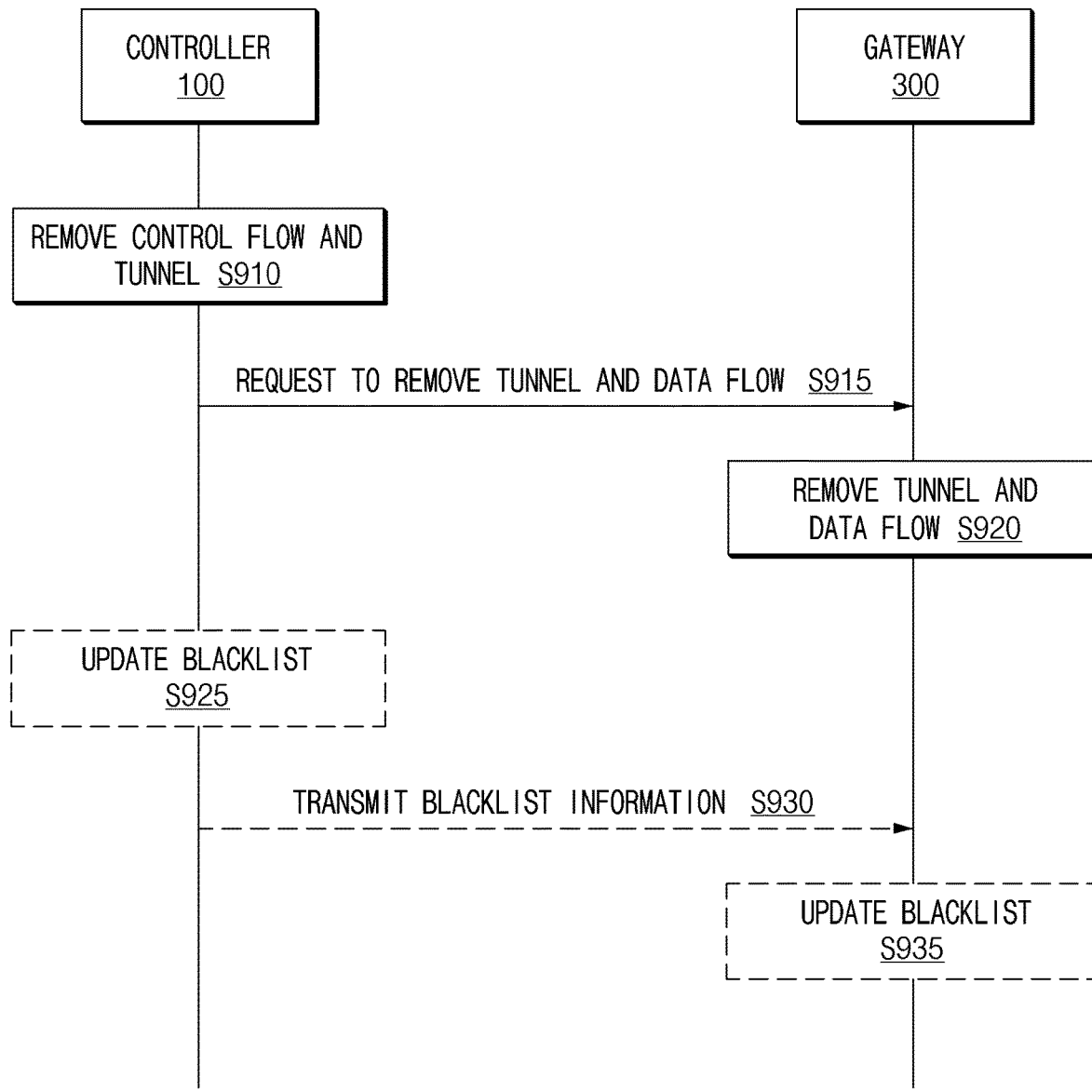
FIG. 18 illustrates a signal sequence diagram for removing control flow according to various embodiments.

FIG. 18 illustrates a signal sequence diagram for removing control flow according to various embodiments.

When a threat is detected, when there is an access end request of a terminal, or when access is abnormally ended, a controller 100 may release control flow and may remove a tunnel and data packet flow, which are dependent on the control flow, thus fundamentally separating the terminal from a network.

Referring to FIG. 18, in S910, the controller 100 may remove control flow and a tunnel of the terminal. For example, the controller 100 may search a control flow table for control flow information based on control flow identification information received from the terminal or identification information of the terminal. The controller 100 may remove the found control flow information and information about the tunnel dependent on the control flow and data flow information.

In S915, the controller 100 may request the gateway 300 to remove a tunnel and data flow, which are dependent on the removed control flow.

In S920, the gateway 300 may remove the tunnel and the data flow. For example, the gateway 300 may remove the tunnel and the data flow based on tunnel identification information (e.g., a source IP, a tunnel ID, and/or a VLAN ID) and data flow identification information. When the tunnel and the data flow are removed, a data packet transmitted to a destination network corresponding to the removed tunnel may be blocked by an access control application 201 or the gateway 300. Through the above-mentioned operation, a system including the terminal 200 may release the authorized tunnel if necessary to provide perfect blocking and separation of the terminal 200 from the network.

In addition, in S925, the controller 100 may identify whether the terminal is a target which should be separated temporarily or permanently based on identification information of a terminal, removal of control flow of which is determined, and a blacklist policy. When the terminal is the target which should be separated, the controller 100 may register identification information of the terminal with a blacklist. The terminal registered with the blacklist may not generate control flow subsequently. In S930, the controller 100 may transmit updated blacklist information to the gateway 300. In S935, the gateway 300 may update the blacklist based on the received information.

The invention claimed is:

1. A system, comprising:
a terminal;
a gateway located on a boundary of a network to which the terminal belongs, wherein the gateway is different from the terminal; and
a server configured to manage data transmission between the terminal and the gateway,
wherein the server generates control flow between the terminal and the server,
wherein when the server receives a controller access request from the terminal, the server transmits identification information of the control flow and a threat detection policy stored in a database of the server to the terminal, receives a controller access update request including threat detection information indicating a result of executing a threat detection function loaded into the terminal based on the threat detection policy from the terminal, and releases the control flow based on the threat detection policy, when threat detection is identified from the threat detection information,
wherein the server receives a network access request including the identification information of the control flow and the threat detection information from the terminal, determines whether network access of the terminal is possible based on the identification information of the control flow, and releases the control flow depending on the threat detection policy and transmits information indicating network access failure to the terminal, when the threat detection is identified from the threat detection information,
wherein the threat detection function is configured to detect a direct threat applied to a minimized attack surface for access to a destination network.

2. The system of claim 1, wherein the server determines that the network access of the terminal is possible based on an access policy stored in the database and transmits information for generating a tunnel and data flow between the terminal and the gateway to the terminal and the gateway.

3. The system of claim 1, wherein the gateway detects a threat using a threat detection function loaded into the gateway, when receiving a data packet from the terminal, drops the data packet, when the threat is detected, and stores a threat detection log including a time when the threat is detected, identification information of a terminal, the threat of which is detected, and a type of the threat, and transmits the stored threat detection log to the server on a periodic basis.

4. The system of claim 3, wherein the gateway routes the data packet to the destination network, when the threat is not detected and the data packet is valid.

5. The system of claim 3, wherein the server analyzes the threat detection log to identify a terminal, the threat of which is detected, and performs an access release procedure of the terminal, the threat of which is detected.

6. The system of claim 1, wherein the terminal transmits the threat detection information to the server on a periodic basis.

7. The system of claim 1, further comprising:
a security system configured to detect a terminal threat and a network threat using a threat detection technique and transmit information about the detected threats and identification information of a terminal, the threat of which is detected, to the server.

8. A server, comprising:
a communication circuitry;
a memory storing a database; and
a processor operatively connected with the communication circuitry and the memory,
wherein the processor manages data transmission between a terminal and a gateway located on a boundary of a network to which the terminal belongs,
wherein the gateway is different from the terminal, and
wherein the processor receives an access request requesting controller access to the server from the terminal, determines whether access of the terminal is possible, based on identification information included in the access request and the database, generates identification information of control flow between the server and terminal, when the access of the terminal is possible, transmits a response including the identification information of the control flow and a threat detection policy included in the database to the terminal, using the communication circuitry, receives a controller access update request including the identification information of the control flow and threat detection information indicating a result of executing a threat detection function based on the threat detection policy from the terminal, determines whether network access of the terminal is possible based on the identification information of the control flow, determines whether to release the control flow between the server and the terminal based on the threat detection information and the threat detection policy, transmits a result of processing the controller access update request to the terminal, releases the control flow depending on the threat detection policy and transmits information indicating network access failure to the terminal, when threat detection is identified from the threat detection information.

9. A terminal, comprising:
a communication circuitry;
a processor operatively connected with the communication circuitry; and
a memory storing instructions executed by the processor,
wherein the processor detects a controller access event for an external server, transmits a controller access request to the external server, using the communication circuitry, receives identification information of control flow between the terminal and the external server in response to the controller access request, from the external server, executes a threat detection function based on a threat detection policy received from the external server, transmits an access update request requesting to update controller access to the external server, using the communication circuitry, and receives and processes a response to the access update request from the external server,
wherein the access update request includes threat detection information indicating a result of executing the threat detection function and information necessary to update the controller access,
wherein the response includes a result of updating the controller access based on the threat detection information,
wherein the processor detects a network access event requesting access to a destination network, requests network access from the external server, using the communication circuitry, receives and processes a response to a network access request from the external server, and transmits the threat detection information together to the external server, when requesting the network access, and
wherein the response to the network access request includes information indicating whether the network access is possible, the information being determined based on the threat detection information.

10. The terminal of claim 9, wherein the processor starts a controller access update procedure again after waiting during a predetermined time, when it succeeds in updating the controller access, and outputs a user interface indicating controller access update failure on a display, when it fails in updating the access.

11. The terminal of claim 9, wherein the processor generates a tunnel between the terminal and a gateway based on received information necessary to generate the tunnel and transmits a data packet through the generated tunnel, when the information necessary to generate the tunnel is received in response to the network access request from the external server.

12. The terminal of claim 9, wherein the processor transmits a data packet to a gateway based on information about an authorized tunnel, when the information about the authorized tunnel between the terminal and the gateway is received in response to the network access request from the external server.

13. A method, comprising:
transmitting, by a terminal, a controller access request to a server;
managing, by the server, data transmission between the terminal and a gateway located on a boundary of a network to which the terminal belongs, wherein the gateway is different from the terminal;
generating, by the server, control flow between the terminal and the server;
transmitting, by the server, identification information of the control flow and a threat detection policy stored in a database of the server to the terminal;
executing, by the terminal, a threat detection function loaded into the terminal based on the threat detection policy;
transmitting, by the terminal, a controller access update request including threat detection information indicating a result of executing the threat detection function to the server; and
releasing, by the server, the control flow based on the threat detection policy, when identifying threat detection based on the threat detection information;
transmitting, by the terminal, a network access request including the identification;
information of the control flow and the threat detection information to the server;
determining, by the server, whether network access of the terminal is possible based on the identification information of the control flow; and
releasing, by the server, the control flow based on the threat detection policy and transmitting, by the server, information indicating network access failure to the terminal, when identifying the threat detection based on the threat detection information,
wherein the threat detection function is configured to detect a direct threat applied to a minimized attack surface for access to a destination network.

14. The method of claim 13, further comprising:
transmitting, by the terminal, a data packet to a gateway;
detecting, by the gateway, a threat using a threat detection function loaded into the gateway, when receiving the data packet;
dropping, by the gateway, the data packet, when the threat is detected, and storing, by the gateway, a threat detection log including a time when the threat is detected, identification information of a terminal, the threat of which is detected, and a type of the threat; and
transmitting, by the gateway, the stored threat detection log to the server on a periodic basis.

15. The method of claim 14, further comprising:
routing, by the gateway, the data packet to a destination network, when the threat is not detected and the data packet is valid.

16. The method of claim 15, further comprising:
analyzing, by the server, the threat detection log to identify the terminal, the threat of which is detected, and performing, by the server, an access release procedure of the terminal, the threat of which is detected.

17. The method of claim 13, further comprising:
detecting, by a security system, a terminal threat and a network threat using a threat detection technique and transmitting, by the security system, information about the detected threats and identification information of a terminal, the threat of which is detected, to the server.

* * * * *